US012731538B2

(12) United States Patent

Zhang et al.

(10) Patent No.: US 12,731,538 B2

(45) Date of Patent: Sep. 8, 2026

(54) DISPLAY PANEL AND DISPLAY APPARATUS WITH OPTIMIZED CAPACITOR ARRANGEMENT IN DRIVING CIRCUIT

(71) Applicants: Wuhan Tianma Microelectronics Co., Ltd. Shanghai Branch, Shanghai (CN); Wuhan Tianma Microelectronics Co., Ltd., Wuhan (CN)

(72) Inventors: Mengmeng Zhang, Shanghai (CN); Yuantao Wu, Shanghai (CN)

(73) Assignees: WUHAN TIANMA MICROELECTRONICS CO., LTD. SHANGHAI BRANCH, Shanghai (CN); WUHAN TIANMA MICROELECTRONICS CO., LTD., Wuhan (CN)

( * ) Notice: Subject to any disclaimer, the term of this patent is extended or adjusted under 35 U.S.C. 154(b) by 0 days.

(21) Appl. No.: 19/271,763

(22) Filed: Jul. 16, 2025

(65) Prior Publication Data

US 2026/0171003 A1 Jun. 18, 2026

(30) Foreign Application Priority Data

Dec. 16, 2024 (CN) ........................ 202411863207.1

(51) Int. Cl.
*G09G 3/32* (2016.01)

(52) U.S. Cl.
CPC ......... *G09G 3/32* (2013.01); *G09G 2300/043* (2013.01); *G09G 2300/0852* (2013.01); *G09G 2310/08* (2013.01); *G09G 2320/0242* (2013.01)

(58) Field of Classification Search
CPC ........................... G09G 3/32; G09G 2300/043
See application file for complete search history.

(56) References Cited

U.S. PATENT DOCUMENTS

2022/0051625 A1* 2/2022 Lai ....................... G09G 3/3233
2023/0093830 A1* 3/2023 Zhang .................. G09G 3/3233 345/690
2024/0213261 A1* 6/2024 Wei ...................... G09G 3/3233

* cited by examiner

*Primary Examiner* — Gustavo Polo
(74) *Attorney, Agent, or Firm* — East IP P.C.

(57) ABSTRACT

The present application discloses a display panel and a display apparatus. In the display panel, the first pixel circuit includes the first driving transistor and the first double-gate transistor connected to the gate of the first driving transistor; the second pixel circuit includes the second driving transistor and the second double-gate transistor which is connected to the gate of the second driving transistor; the first transistor and the second transistor of the first double-gate transistor are connected to the first node, and the first node is connected to one end of the first capacitor; the third transistor and the fourth transistor of the second double-gate transistor are connected to the second node, and the second node is connected to one end of the second capacitor; and the overlapped area of two plates of the first capacitor is different from the overlapped area of two plates of the second capacitor.

20 Claims, 15 Drawing Sheets

DISPLAY PANEL AND DISPLAY APPARATUS WITH OPTIMIZED CAPACITOR ARRANGEMENT IN DRIVING CIRCUIT

CROSS-REFERENCE TO RELATED APPLICATION

The present application claims priority to Chinese Patent Application No. 202411863207.1 entitled "DISPLAY PANEL AND DISPLAY APPARATUS" filed on, Dec. 16, 2024, the entire contents of which are incorporated here by reference.

TECHNICAL FIELD

The present application relates to the field of display technology, and particularly, to a display panel and a display apparatus.

BACKGROUND

The planar display apparatuses based on the organic light emitting diode (OLED), the light emitting diode (LED), and the like are widely used in cell phones, TVs, notebook computers, desktop computers and other consumer electronic products due to their high quality of image, power saving, thin body and wide range of applications, and have become the mainstream among the display apparatuses.

The display panels include a plurality of pixel circuits which are arranged in a matrix, and the pixel circuits are provided with the driving transistors and other switching transistors. Based on the collaboration of the plurality of transistors, the pixel circuits transmit the driving current to the light-emitting elements to drive the light-emitting elements to emit light.

However, due to the effect of the leakage currents at the gate nodes of the driving transistors, the deviation in the brightness of the light-emitting elements occurs, and under a condition the leakage currents in sub-pixels of different colors are different one another, the color cast of the display panel will occur.

SUMMARY

Embodiments of the present application provide a display panel and a display apparatus, which can reduce the color cast of the display panel.

In a first aspect, embodiments of the present application provide a display panel which includes the sub-pixels, the sub-pixels include the first sub-pixels and the second sub-pixels, the first sub-pixels each include the first pixel circuit and the first light-emitting element which are connected to each other, the second sub-pixels each include the second pixel circuit and the second light-emitting element which are connected to each other, and the light-emitting colors of the first light-emitting element and the second light-emitting element are different one another; the first pixel circuit includes the first driving transistor and the first double-gate transistor which is connected to the gate of the first driving transistor; the second pixel circuit includes the second driving transistor and the second double-gate transistor which is connected to the gate of the second driving transistor; the first double-gate transistor includes the first transistor and the second transistor which are connected to the first node, and the first node is connected to one end of the first capacitor; the second double-gate transistor includes the third transistor and the fourth transistor which are connected to the second node, and the second node is connected to one end of the second capacitor; and along the direction perpendicular to the plane where the display panel is located, the overlapped area of two plates of the first capacitor is different from the overlapped area of two plates of the second capacitor.

In a second aspect, embodiments of the present application provide a display apparatus including the display panel according to the embodiments of the first aspect.

The above description is merely an overview of the technical solutions of the present application. In order to make the technical means of the present application understood more clearly and implemented according to the contents of the description, and in order to make the above and other objects, features and advantages of the present application understood more obviously, specific detailed description of the present application are particularly provided below.

BRIEF DESCRIPTION OF THE DRAWINGS

Other features, objects and advantages of the present application will become more apparent from reading the following detailed description of the non-limiting embodiments with reference to the drawings, in which the same or similar reference numerals represent the same or similar features, and the drawings are not drawn to actual scale.

DETAILED DESCRIPTION

Figure 1:
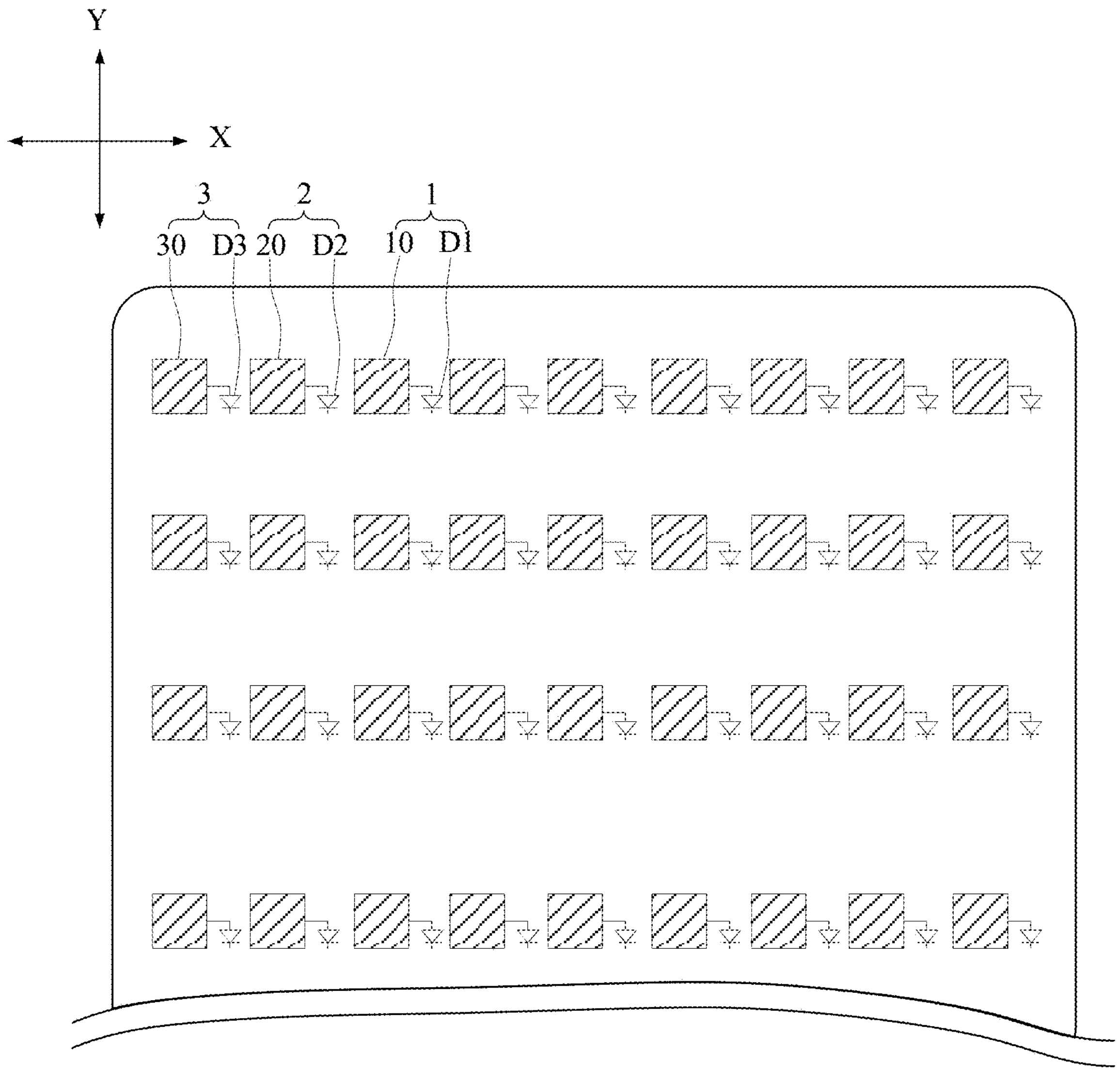
FIG. 1 shows a schematic structural top view of a display panel according to embodiments of the present application.

Features and exemplary embodiments of various aspects of the present application will be described in detail below. In order to make the objects, technical solutions and advantages of the present application clearer, the present application is further described in detail below with reference to the drawings and specific embodiments. It should be understood that the specific embodiments described herein are only used to explain the present application, but not to limit the present application. For those skilled in the art, the present application may be implemented without some of these specific details. The following description of the embodiments is only to provide a better understanding of the present application by illustrating examples of the present application.

It should be noted that, in the present application, the relational terms, such as first and second, are used merely to distinguish one entity or operation from another entity or operation, without necessarily requiring or implying any actual such relationships or orders for these entities or operations. Moreover, the terms "comprise", "include", or any other variants thereof, are intended to represent a non-exclusive inclusion, such that a process, method, article or device including a series of elements includes not only those elements, but also other elements that are not explicitly listed or elements inherent to such a process, method, article or device. Without more constraints, the elements following an expression "comprise/include . . . " do not exclude the existence of additional identical elements in the process, method, article or device that includes the elements.

It should be understood that when the structure of a component is described, if a layer/region is referred to as being "on" or "above" another layer/region, it may mean that the layer/region is directly on the other layer/region or that other layers/regions may be included between the layer/region and the other layer/region. Moreover, if the component is turned over, the layer/region will be "below" or "under" the other layer/region.

It should be understood the term "and/or" used herein refers to only an association relationship for describing associated objects, and means that there may be three kinds of relationships. For example, "A and/or B" may represent three cases including: "A exists alone", "A and B exist simultaneously", and "B exists alone". In addition, the character "/" herein generally indicates that the associated objects have an "or" relationship.

In the description of the embodiments of the present application, the technical terms "mounted", "connected", "connection", "fixed", and the like should be interpreted in a broad sense, for example, they may refer to a fixed connection, a detachable connection or integration; a mechanical connection, or an electrical connection; a direct connection, an indirect connection through an intermediate medium, or an internal connection or an interaction relationship between two elements. For those of ordinary skill in the art, the specific meanings of the above terms in the embodiments of the present application may be understood in accordance with specific conditions.

It will be apparent to those skilled in the art that various modifications and variations can be made to the present application without departing from the gist or scope of the present application. Accordingly, the present application is intended to encompass the modifications and variations to the present application that fall within the scope of the appended claims (the claimed technical solutions) and equivalents thereof. It should be noted that implementations provided by the embodiments of the present application can be combined with one another if there is no conflict.

Before the technical solutions provided by the embodiments of the present application are described, the problems in the art are first described in the present application to facilitate the understanding of the embodiments of the present application.

With the development of display technology, functions of display panels are more and more diversified. For example, the display panels support low-frequency display. However, in the low-frequency display mode, the display panels are prone to the color casts. Particularly, when the temperature rises or the ambient light increases, the color casts will be relatively serious. For example, the display panels have the problem that white images are not white.

A display panel usually includes sub-pixels of a plurality of light-emitting colors, the sub-pixels of various light-emitting colors include pixel circuits and light-emitting elements, the pixel circuits include driving transistors, data voltages are written to the gates of the driving transistors, and the driving transistors generate certain driving currents based on the written data voltages to drive the light-emitting elements to emit light.

The inventors have found that the cause of the color cast is that, the light-emitting characteristics of the sub-pixels of different light-emitting colors are different one another, under a condition that the white images are displayed, the driving currents required for the sub-pixels of different light-emitting colors are different one another, and the data voltages written to the gates of the driving transistors in the sub-pixels of different light-emitting colors are different one another, resulting in different degrees of current leakage of the gates of the driving transistors in the sub-pixels of different light-emitting colors, thereby causing the color cast.

In order to solve the above problem, embodiments of the present application provide a display panel and a display apparatus. The embodiments of the display panel and the display apparatus will be described below with reference to the drawings.

Figure 2:
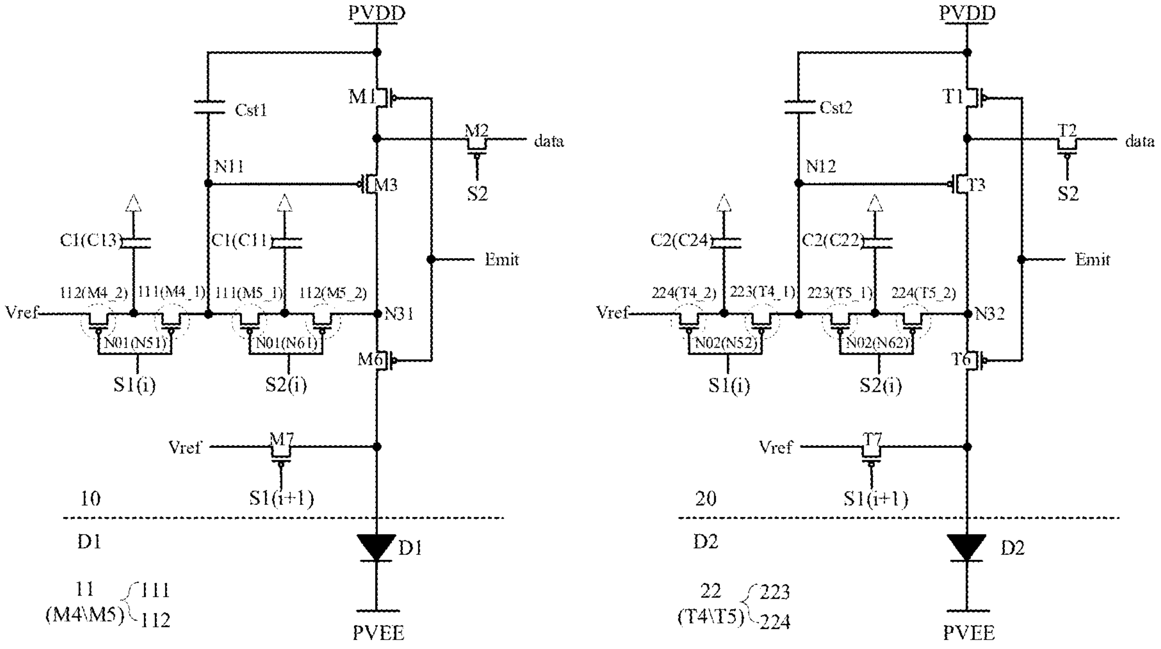
FIG. 2 shows a topological schematic structural view of pixel circuits in a display panel according to embodiments of the present application.

Referring to FIG. 1 and FIG. 2, the display panel 100 includes the sub-pixels which include the first sub-pixels 1 and the second sub-pixels 2, the first sub-pixels 1 each include the first pixel circuit 10 and the first light-emitting element D1 which are connected to each other, the second sub-pixels 2 each include the second pixel circuit 20 and the second light-emitting element D2 which are connected to each other, and the light-emitting colors of the first light-emitting element D1 and the second light-emitting element D2 are different one another.

The first pixel circuit 10 includes the first driving transistor M3 and the first double-gate transistor 11 which is connected to the gate of the first driving transistor M3. For convenience of description, in FIG. 2, an example is given in which the first double-gate transistor 11 and the gate of the first driving transistor M3 are connected to the node N11.

The first double-gate transistor 11 includes the first transistor 111 and the second transistor 112 which are connected to the first node N01, and the first node N01 is connected to one end of the first capacitor C1.

The second pixel circuit 20 includes the second driving transistor T3 and the second double-gate transistor 22 which is connected to the gate of the second driving transistor T3. For convenience of description, in FIG. 2, an example is given in which the second double-gate transistor 22 and the gate of the second driving transistor T3 are connected to N12.

The second double-gate transistor 22 includes the third transistor 223 and the fourth transistor 224 which are connected to the second node N02, and the second node N02 is connected to one end of the second capacitor C2.

Along the direction perpendicular to the plane where the display panel is located, the overlapped area of two plates of the first capacitor C1 is different from the overlapped area of two plates of the second capacitor C2. The overlapped area of two plates of the capacitor determines the capacitance of the capacitor. The capacitance of the first capacitor C1 is different from the capacitance of the second capacitor C2. For example, the lower plate of the first capacitor C1 is in the same film layer as the lower plate of the second capacitor C2, and the upper plate of the first capacitor C1 is in the same film layer as the upper plate of the second capacitor C2.

In an example, the circuit topology of the first pixel circuit is the same as the circuit topology of the second pixel circuit. The first double-gate transistor and the second double-gate transistor may be understood as the transistors with equivalent connection locations in the two pixel circuits. For example, the pixel circuits include the reset transistors and the threshold compensation transistors which are connected to the driving transistors, the reset transistors are configured to reset the gates of the driving transistors, and the threshold compensation transistors are used for threshold compensation of the driving transistors. The first double-gate transistor and the second double-gate transistor may include the reset transistors in the first pixel circuit and the second pixel circuit, and/or the first double-gate transistor and the second double-gate transistor may include the threshold compensation transistors in the first pixel circuit and the second pixel circuit.

Figure 3:
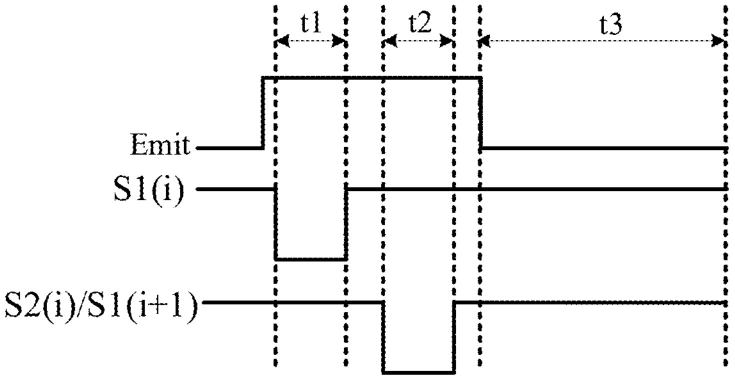
FIG. 3 shows a schematic view of a time sequence corresponding to FIG. 2.

In an example, as shown in FIG. 3, the operation process of the pixel circuits may include the first phase t1, the second phase t2, and the light-emitting phase t3, and the first phase t1 and the second phase t2 are non-light-emitting phases. In the first phase t1, the reset signals on the reset signal lines Vref are written to the gates of the first driving transistor M3 and the second driving transistor T3, respectively. In the second phase t2, the data signals on the data signal lines data are written to the gates of the first driving transistor M3 and the second driving transistor T3, respectively, and the threshold voltages of the first driving transistor M3 and the second driving transistor T3 are compensated, respectively. In the light-emitting phase t3, the first light-emitting element D1 and the second light-emitting element D2 emit light.

It should be noted that the circuit topologies of the first pixel circuit and the second pixel circuit shown in FIG. 2 and the time sequence shown in FIG. 3 are merely examples, which is not intended to limit the present application.

For the first pixel circuit, the gate of the first driving transistor M3 and the first double-gate transistor 11 are connected to the node N11, the first transistor and the second transistor of the first double-gate transistor 11 are connected to the first node N01, and the potential of the first node N01 is pulled up by the coupling of the scanning signal line S1(*i*) or the scanning signal line S2(*i*), so that the leakage current exists between the node N11 and the first node N01.

For the second pixel circuit, the gate of the second driving transistor T3 and the second double-gate transistor 22 are connected to the node N12, the third transistor and the fourth transistor of the second double-gate transistor 22 are connected to the second node N02, and the potential of the second node N02 is pulled up by the coupling of the scanning signal line S1(*i*) or the scanning signal line S2(*i*), so that the leakage current exists between the node N12 and the second node N02.

Since the light-emitting characteristics of the sub-pixels of different light-emitting colors are different one another, under a condition that the white images are displayed, the driving currents required for the sub-pixels of different light-emitting colors are different one another, and the data voltages written to the gates of the driving transistors in the sub-pixels of different light-emitting colors are different one another. That is, since the potential of the node N11 is different from the potential of the node N12, under a condition that the potential of the first nodes N01 remains the same as the potential of the second nodes N02, the degree of the current leakage of the node N11 will be different from the degree of the current leakage of the node N12. For example, the current leakage speed of one of the node N11 and the node N12 may be relatively fast, resulting in the color cast in the displayed white images.

In the display panel according to the embodiments of the present application, the first sub-pixels and the second sub-pixels of different light-emitting colors are set differently; specifically, the overlapped area of two plates of the first capacitor is different from the overlapped area of two plates of the second capacitor, so that the ability of the first capacitor to control the potential of the first node is different from the ability of the second capacitor to control the potential of the second node, and the potential difference between the first node and the second node may flexibly match the potential difference between the gate of the first driving transistor and the gate of the second driving transistor, providing the desired condition under which the potential difference between the gate of the first driving transistor and the first node tends to be the same as the potential difference between the gate of the second driving transistor and the second node, which can be beneficial for solving the problem of color cast.

In an example, the other end of the first capacitor C1 is connected to the fixed voltage signal line, and the other end of the second capacitor C2 is also connected to the fixed voltage signal line. For example, the other end of the first capacitor C1 and the other end of the second capacitor C2 are connected to the first power supply lines PVDD which are used for providing the fixed voltage sources for the pixel circuits. The other end of the first capacitor C1 and the other end of the second capacitor C2 are connected to the reset signal lines Vref which are used for providing the reset signals for the pixel circuits. In this example, the first capacitor C1 is used for maintaining the stability of the potential of the first node, and the second capacitor C2 is used for maintaining the stability of the potential of the second node.

As an example, as shown in FIG. 2, the first electrode of the first driving transistor M3 and the first electrode of the second driving transistor T3 are connected to the first power supply lines PVDD, the first double-gate transistor 11 includes the first threshold compensation transistor M5 which is connected between the gate of the first driving transistor M3 and the second electrode of the first driving transistor, and the second double-gate transistor 22 includes the second threshold compensation transistor T5 which is connected between the gate of the second driving transistor T3 and the second electrode of the second driving transistor T3.

The first capacitor C1 includes the first sub-capacitor C11 which is connected to the connection node (the node N61) of two transistors in the first threshold compensation transistor M5. The second capacitor C2 includes the second sub-capacitor C22 which is connected to the connection node (the node N62) of two transistors in the second threshold compensation transistor T5. The overlapped area of two plates of the first sub-capacitor C11 is different from the overlapped area of two plates of the second sub-capacitor C22.

As another example, the first double-gate transistor 11 includes the first reset transistor M4 which is connected between the gate of the first driving transistor M3 and the reset signal line Vref, and the second double-gate transistor 22 includes the second reset transistor T4 which is connected between the gate of the second driving transistor T3 and the reset signal line Vref.

The first capacitor C1 includes the third sub-capacitor C13 which is connected to the connection node (the node N51) of two transistors in the first reset transistor M4. The second capacitor C2 includes the fourth sub-capacitor C24 which is connected to the connection node (the node N52) of two transistors in the second reset transistor T4. The overlapped area of two plates of the third sub-capacitor C13 is different from the overlapped area of two plates of the fourth sub-capacitor C24.

In an example, the overlapped area of two plates of the first sub-capacitor C11 is different from the overlapped area of two plates of the second sub-capacitor C22, and/or the overlapped area of two plates of the third sub-capacitor C13 is different from the overlapped area of two plates of the fourth sub-capacitor C24.

In an example, the display panel includes the red sub-pixels, the green sub-pixels, and the blue sub-pixels, the light-emitting elements of the red sub-pixels emit red light, the light-emitting elements of the green sub-pixels emit green light, and the light-emitting elements of the blue sub-pixels emit blue light.

In some embodiments, the first light-emitting elements emit blue light, the second light-emitting elements emit red light or green light, and the overlapped area of two plates of the first capacitor is greater than the overlapped area of two plates of the second capacitor.

The inventors have found that under a condition that the white images are displayed, the driving currents required for the blue sub-pixels are the greatest, for the P-type of driving transistors, the potential of the gates of the driving transistors in the blue sub-pixels is the lowest, and is usually 0.1 V to 0.6 V lower than the potential of the gates of the driving transistors in the red sub-pixels or the green sub-pixels. The lower the potential of the gates of the driving transistors is, the faster the current leakage speed of the driving transistors is, which results in a decrease in the light brightness of the blue sub-pixels, causing the color cast, such as the reddishness.

The potential of the first node and the second node is pulled up by the coupling of the scanning signal line S1(*i*) and the scanning signal line S2(*i*), in this embodiment, under a condition that the first capacitor and the second capacitor are used for maintaining the stability of the potential, since the overlapped area of the two plates of the first capacitor in the blue sub-pixel is greater, the first capacitor has the greater ability to maintain the potential of the first node, and the pulled-up potential of the first node in the blue sub-pixel by the coupling is lower than the pulled-up potential of the second node in the red/green sub-pixel by the coupling, so that the difference between the potential of the first node in the blue sub-pixel and the potential of the gate of the first driving transistor in the blue sub-pixel is close to the difference between the potential of the second node in the red/green sub-pixel and the potential of the gate of the second driving transistor in the red/green sub-pixel, and the leakage current of the gate of the first driving transistor in the blue sub-pixel tends to be the same as the leakage current of the gate of the second driving transistor in the red/green sub-pixel, thereby reducing the reddishness.

In the following examples, under a condition that the white images are displayed, the driving currents required for the blue sub-pixels are the greatest, that is, an example is given in which the first light-emitting elements emit blue light, and the second light-emitting elements emit red light or green light, so as to explain the magnitude relationship of the parameters between the first sub-pixel and the second sub-pixel.

In an example, the overlapped area of two plates of the first sub-capacitor C11 is greater than the overlapped area of two plates of the second sub-capacitor C22, and/or the overlapped area of two plates of the third sub-capacitor C13 is greater than the overlapped area of two plates of the fourth sub-capacitor C24.

In an example, the first sub-capacitor C11, the second sub-capacitor C22, the third sub-capacitor C13, and the fourth sub-capacitor C24 are used for maintaining the stability of the potential.

In the first sub-capacitor C11 and the second sub-capacitor C22, since the overlapped area of two plates of the first sub-capacitor C11 is relatively great, so that the first sub-capacitor C11 has the greater ability to maintain the potential of the node N61, the pulled-up potential of the node N61 by the coupling of the scanning signal line S2(*i*) is lower than the pulled-up potential of the node N62 by the coupling of the scanning signal line S2(*i*), the potential of the node N11 is lower than the potential of the node N12, and finally, the potential difference between the node N61 and the node N11 is close to the potential difference between the node N62 and the node N12, thereby equalizing the leakage currents between the driving transistor and the threshold compensation transistor in the first sub-pixel and the second sub-pixel.

In the third sub-capacitor C13 and the fourth sub-capacitor C24, since the overlapped area of two plates of the third sub-capacitor C13 is relatively great, so that the third sub-capacitor C13 has the greater ability to maintain the potential of the node N51, the pulled up potential of the node N51 by the coupling of the scanning signal line S1(*i*) is lower than the pulled up potential of the node N52 by the coupling of the scanning signal line S1(*i*), the potential of the node N11 is lower than the potential of the node N12, and finally, the potential difference between the node N51 and the node N11 is close to the potential difference between the node N52 and the node N12, thereby equalizing the leakage currents between the driving transistor and the reset transistor in the first sub-pixel and the second sub-pixel.

In some embodiments, as shown in FIG. 2, the first transistor 111 is connected between the gate of the first driving transistor M3 and the second transistor 112, and the third transistor 223 is connected between the gate of the second driving transistor T3 and the fourth transistor 224. The channel area of the first transistor 111 is less than the channel area of the third transistor 223.

The transistor includes the active layer and the gate, the active layer includes the channel, the source region, and the drain region, along the direction perpendicular to the plane where the display panel is located, the channel overlaps with the gate of the transistor, and the source are and the drain region do not overlap with the gate of the transistor. The channel area of the transistor is the product of the length of the channel of the transistor and the width of the channel. In other words, the channel area may be considered as the area of the orthographic projection of the channel on the plane where the display panel is located.

The gate of the first transistor 111 and the gate of the third transistor 223 are connected to the scanning signal line S1(*i*) or the scanning signal line S2(*i*), the channel area of the first transistor 111 is relatively small, so that the effect of the degree of the coupling of the scanning signal line on the first transistor is relatively small, the pulled-up potential of the first node N01 by the coupling of the scanning signal line is lower than the pulled-up potential of the second node N02 by the coupling of the scanning signal line, the potential of the node N11 is lower than the potential of the node N12, the difference between the potential of the first node in the first sub-pixel and the potential of the gate of the first driving transistor in the first sub-pixel is close to the difference between the potential of the second node in the second sub-pixel and the potential of the gate of the second driving transistor in the second sub-pixel, and the leakage current of the gate of the first driving transistor in the blue sub-pixel tends to be the same as the leakage current of the gate of the second driving transistor in the red/green sub-pixel.

In an example, as shown in FIG. 2, the first transistor 111 includes the transistor M4_1 and the transistor M5_1, and the second transistor 112 includes the transistor M4_2 and the transistor M5_2. The third transistor 223 includes the transistor T4_1 and the transistor T5_1, and the fourth transistor 224 includes the transistor T4_2 and the transistor T5_2.

The channel area of the transistor M4_1 is less than the channel area of the transistor T4_1, and/or the channel area of the transistor M5_1 is less than the channel area of the transistor T5_1.

In some embodiments, as shown in FIG. 2, the first transistor 111 is connected between the gate of the first driving transistor M3 and the second transistor 112, and the third transistor 223 is connected between the gate of the second driving transistor T3 and the fourth transistor 224. The channel length of the second transistor 112 is less than the channel length of the fourth transistor 224.

For example, the other end of the second transistor 112 and the other end of the fourth transistor 224 are connected to the reset signal lines Vref which leak the electricity to the node N51 through the second transistor 112 and to the node N52 through the fourth transistor 224, respectively, the channel length of the second transistor 112 is relatively small, and the electricity leakage path between the reset signal line Vref and the node N51 is shorter, so that the electricity leakage speed between the reset signal line Vref and the node N51 is faster, the potential of the node N51 is lower than the potential of the node N52, the potential of the node N11 is lower than the potential of the node N12, and the potential difference between the node N51 and the node N11 is relatively close to the potential difference between the node N52 and the node N12, thereby equalizing the leakage currents between the gate of the first sub-pixel and the gate of the second sub-pixel.

In an example, the channel length of the transistor M4_2 is less than the channel length of the transistor T4_2, and/or the channel length of the transistor M5_2 is less than the channel length of the transistor T5_2.

In some embodiments, as shown in FIG. 2, the first transistor 111 is connected between the gate of the first driving transistor M3 and the second transistor 112, and the third transistor 223 is connected between the gate of the second driving transistor T3 and the fourth transistor 224. The channel area of the first transistor 111 is less than the channel area of the second transistor 112.

In an example, the channel area of the transistor M4_1 is less than the channel area of the transistor M4_2, and/or the channel area of the transistor M5_1 is less than the channel area of the transistor M5_2.

Taking the transistor M4_1 and the transistor M4_2 as an example, the channel area of the transistor M4_1 is relatively small, and the less the degree of the coupling between the transistor M4_1 and the scanning signal line S1(*i*) is, the less the turn-off current of the transistor M4_1 is; and in the process that the level of the scanning signal line S1(*i*) is changed from the low level to the high level, the current flows from the node N51 to the node N11, so that the potential of the node N51 is lower, and the potential difference between the node N51 and the node N11 is relatively close to the potential difference between the node N52 and the node N12, thereby equalizing the leakage currents between the gate of the first sub-pixel and the gate of the second sub-pixel.

Similarly, the channel area of the transistor M5_1 is relatively small, and the less the degree of the coupling between the transistor M5_1 and the scanning signal line S2(*i*) is, the less the turn-off current of the transistor M5_1 is; and in the process that the level of the scanning signal line S2(*i*) is changed from the low level to the high level, the current flows from the node N61 to the node N11, so that the potential of the node N61 is lower, and the potential difference between the node N61 and the node N11 is relatively close to the potential difference between the node N62 and the node N12, thereby equalizing the leakage currents between the gate of the first sub-pixel and the gate of the second sub-pixel.

Figure 4:
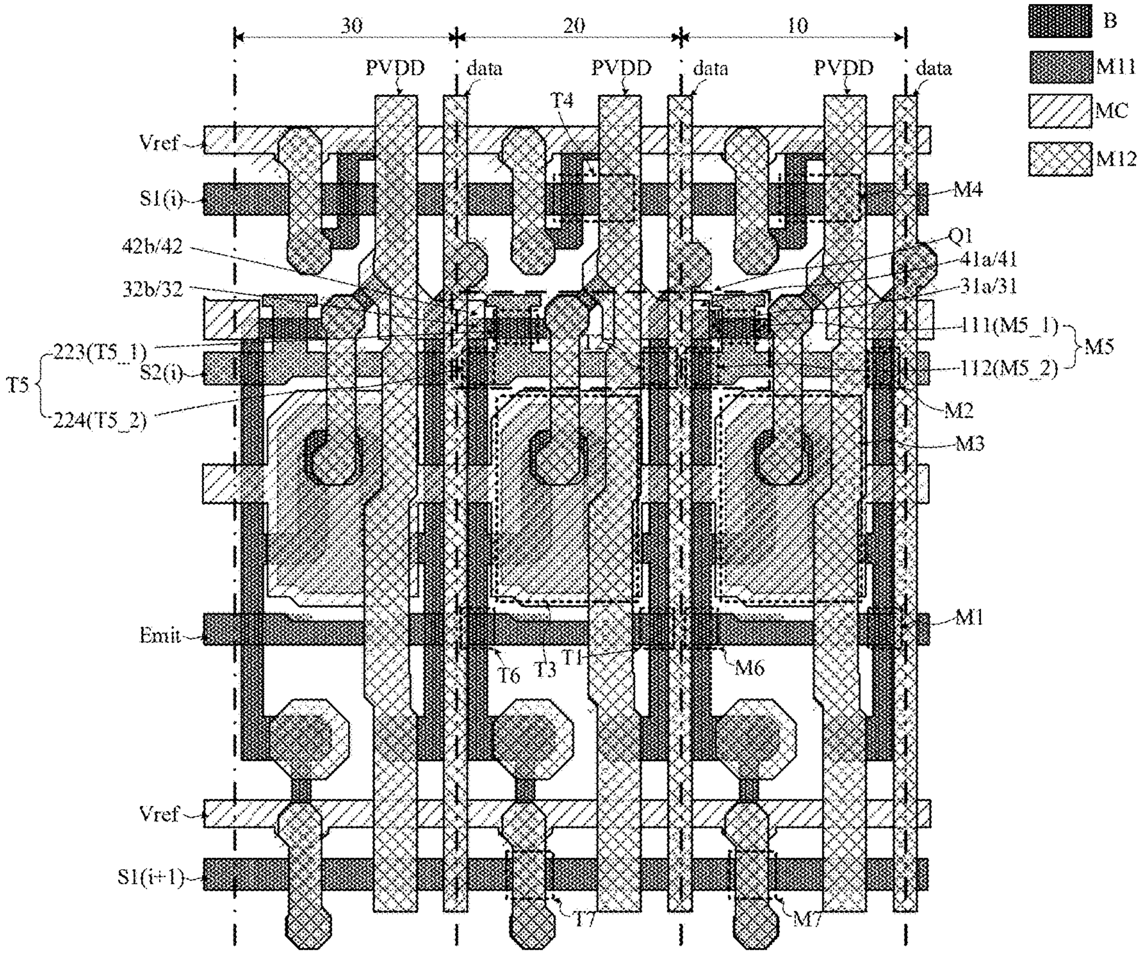
FIG. 4 shows a schematic structural view of a layout of a partial area of a display panel according to embodiments of the present application.
Figure 5:
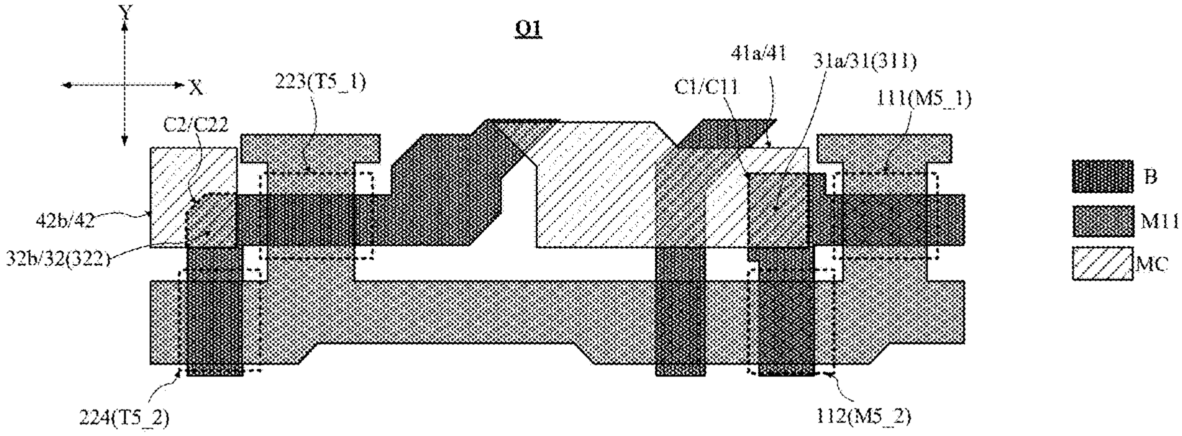
FIG. 5 shows an enlarged schematic view of partial structures in area Q1 in FIG. 4.

In some embodiments, referring to FIG. 2, FIG. 4, and FIG. 5, the first transistor 111 and the second transistor 112 are connected by the first connection structure 31*a*, the third transistor 223 and the fourth transistor 224 are connected by the second connection structure 32*b*, and the display panel further includes the first conductive portion 41*a* and the second conductive portion 42*b* which receive the fixed voltage signals. For example, the fixed voltage signals includes the signals transmitted by the first power supply lines PVDD or the signals transmitted by the reset signal lines Vref.

The first connection structure 31*a* and the first conductive portion 41*a* at least partially overlap along the thickness direction of the display panel to form the first capacitor C1, and the second connection structure 32*b* and the second conductive portion 42*b* at least partially overlap along the thickness direction of the display panel to form the second capacitor C2.

For example, the first connection structure 31*a*, the active layer of the first transistor 111, and the active layer of the second transistor 112 are located in the same film layer, and the material of the first connection structure 31*a* includes the semiconductor material. The second connection structure 32*b*, the active layer of the third transistor 223, and the active layer of the fourth transistor 224 are located in the same film layer, and the material of the second connection structure 32*b* includes the semiconductor material.

In an example, the first connection structure 31*a* and the second connection structure 32*b* are located in the same film layer, and the first conductive portion 41*a* and the second conductive portion 42*b* are located in another film layer.

For example, the first connection structure 31*a* and the second connection structure 32*b* are designed differently, and/or the first conductive portion 41*a* and the second conductive portion 42*b* are designed differently, so that the overlapped area of two plates of the first capacitor C1 is different from the overlapped area of two plates of the second capacitor C2.

As an example, referring to FIG. 4 and FIG. 5, the first connection structure 31*a* includes the first sub-portion 311 which overlaps with the first conductive portion 41*a* along the thickness direction of the display panel. It is understood that the first sub-portion 311 is the part of the first connection structure 31*a* which overlaps with the first conductive portion 41*a*, and the part of the first connection structure 31*a* other than the first sub-portion 311 does not overlap with the first conductive portion 41*a* along the thickness direction of the display panel.

The second connection structure 32*b* includes the second sub-portion 322 which overlaps with the second conductive portion 42*b* along the thickness direction of the display panel. It is understood that the second sub-portion 322 is the part of the second connection structure 32*b* which overlaps with the second conductive portion 42*b*, and the part of the second conductive portion 42*b* other than the second sub-portion 322 does not overlap with the second conductive portion 42*b* along the thickness direction of the display panel.

The area of the first sub-portion 311 is greater than the area of the second sub-portion 322.

In this embodiment, by designing the first connection structure 31*a* and the second connection structure 32*b* differently, the overlapped area of two plates of the first capacitor C1 is different from the overlapped area of two plates of the second capacitor C2.

Figure 6:
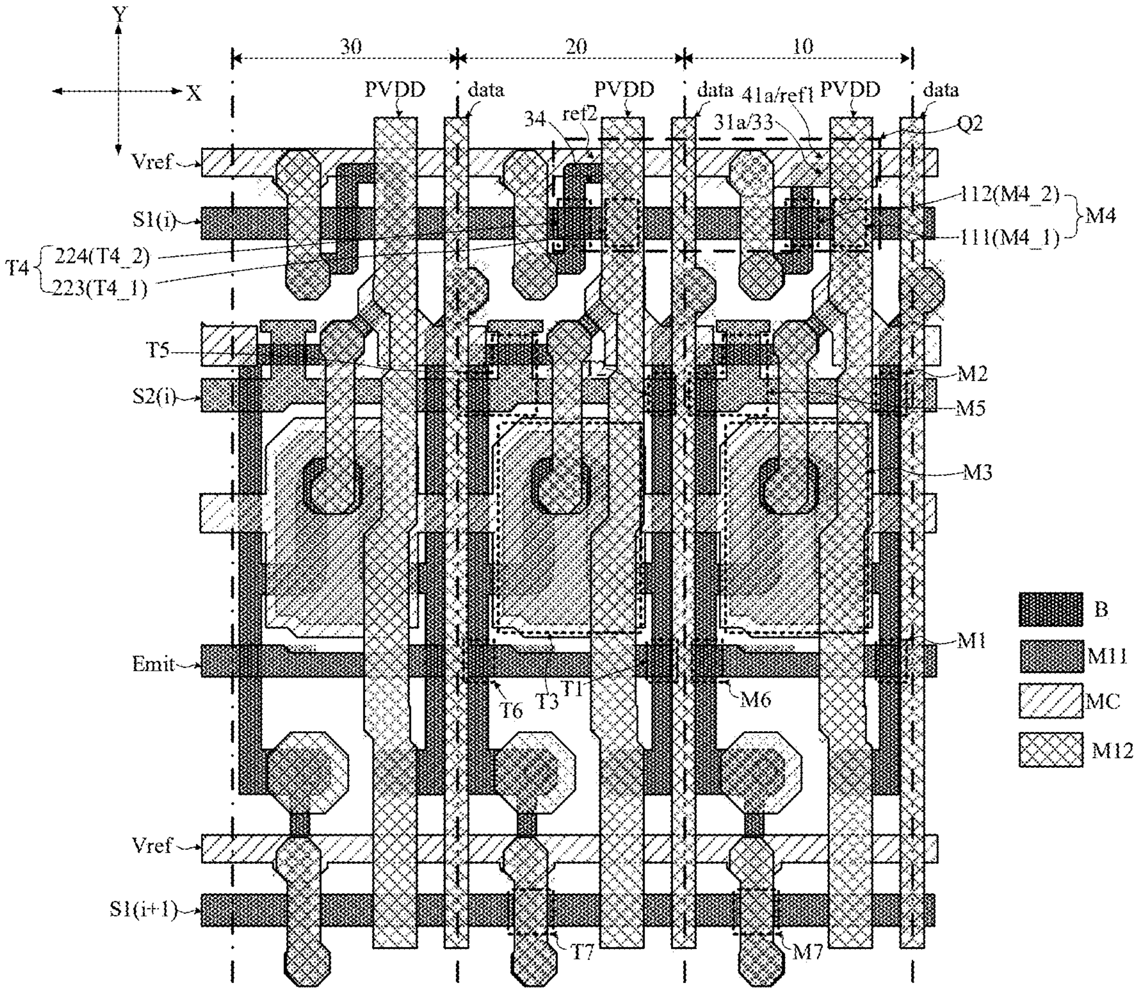
FIG. 6 shows another schematic structural view of a layout of a partial area of a display panel according to embodiments of the present application.
Figure 7:
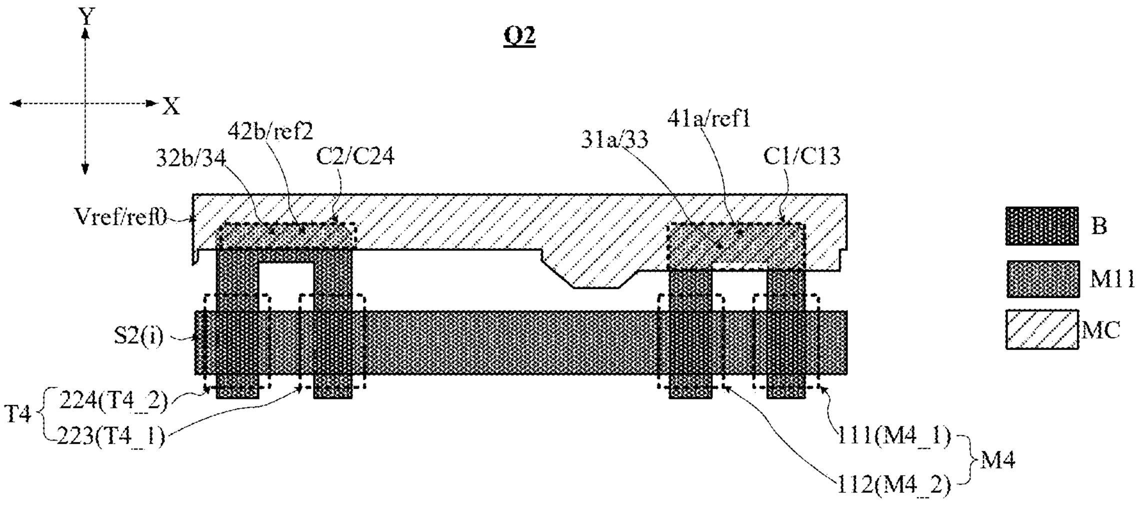
FIG. 7 shows an enlarged schematic view of partial structures in area Q2 in FIG. 6.

As another example, referring to FIG. 6 and FIG. 7, the first conductive portion 41*a* includes the third sub-portion ref1 which overlaps with the first connection structure 31*a* along the thickness direction of the display panel. It may be understood that the third sub-portion ref1 is the part of the first conductive portion 41*a* which overlaps with the first connection structure 31*a*, and the part of the first conductive portion 41*a* other than the third sub-portion ref1 does not overlap with the first connection structure 31*a* along the thickness direction of the display panel.

The second conductive portion 42*b* includes the fourth sub-portion ref2 which overlaps with the second connection structure 32*b* along the thickness direction of the display panel. It may understood that the fourth sub-portion ref2 is the part of the second conductive portion 42*b* which overlaps with the second connection structure 32*b*, and the part of the second conductive portion 42*b* other than the fourth sub-portion ref2 does not overlap with the second connection structure 32*b* along the thickness direction of the display panel.

The area of the third sub-portion ref1 is greater than the area of the fourth sub-portion ref2.

In this embodiment, by designing the first conductive portion 41*a* and the second conductive portion 42*b* differently, the overlapped area of two plates of the first capacitor C1 is different from the overlapped area of two plates of the second capacitor C2.

In some embodiments, referring to FIG. 2, FIG. 4, and FIG. 5, the first electrode of the first driving transistor M3 and the first electrode of the second driving transistor T3 are connected to the first power supply lines PVDD, the first double-gate transistor 11 includes the first threshold compensation transistor M5 which is connected between the gate of the first driving transistor M3 and the second electrode of the first driving transistor, and the second double-gate transistor 22 includes the second threshold compensation transistor T5 which is connected between the gate of the second driving transistor T3 and the second electrode thereof. The first capacitor C1 includes the first sub-capacitor C11, and the second capacitor C2 includes the second sub-capacitor C22. The first connection structure 31*a* includes the first trace structure 31, the second connection structure 32*b* includes the second trace structure 32, the first conductive portion 41*a* includes the first shielding structure 41, and the second conductive portion 42*b* includes the second shielding structure 42. The first transistor 111 (that is, the transistor M5_1) and the second transistor 112 (that is, the transistor M5_2) in the first threshold compensation transistor M5 are connected by the first trace structure 31, and the first shielding structure 41 and the first trace structure 31 at least partially overlap along the thickness direction of the display panel to form the first sub-capacitor C11. The third transistor 223 (that is, the transistor T5_1) and the fourth transistor 224 (that is, the transistor T5_2) in the second threshold compensation transistor T5 are connected by the second trace structure 32, and the second shielding structure 42 and the second trace structure 32 at least partially overlap along the thickness direction of the display panel to form the second sub-capacitor C22. In addition, the first shielding structure 41 and the second shielding structure 42 are connected to the first power supply lines PVDD.

In the layout structure herein, the structures filled with the same patterns represent the structures located in the same film layer, and the structures filled with different patterns represent the structures located in different film layers. In an example, the display panel includes the semiconductor layer B, the first metal layer M11, the capacitive metal layer MC, and the second metal layer M12 which are provided away from the semiconductor layer B in sequence. The insulation layer is provided between the semiconductor layer and the metal layer, and between the different metal layers. The semiconductor layer B includes the active layers of the transistors, the first metal layer M11 includes the scanning signal line S1(*i*), the scanning signal line S2(*i*), and the gates of the transistors, the capacitive metal layer MC includes the upper plate of the storage capacitor, and the reset signal lines Vref, and the second metal layer M12 includes the first power supply lines PVDD and the data signal lines data. It may be understood that the material of the semiconductor layer includes a semiconductor, and the material of the metal layer includes a metal. For example, the material of the semiconductor layer B includes polysilicon (poly).

In an example, the first trace structure 31 and the second trace structure 32 are located in the semiconductor layer 01.

The first shielding structure 41 and the second shielding structure 42 are located in the capacitive metal layer MC.

The parts of the first shielding structure 41 which overlap with the first trace structure 31 can be used as two plates of the first sub-capacitor C11, respectively, and the parts of the second shielding structure 42 which overlap with the second trace structure 32 can be used as two plates of the second sub-capacitor C22, respectively.

In an example, the first shielding structure 41 and the second shielding structure 42 can shield light to reduce the effect of light on the characteristics of the transistors.

In an example, the first power supply lines PVDD are used for transmitting the fixed voltages, and the first shielding structure 41 and the second shielding structure 42 are connected to the first power supply lines PVDD, so that the first sub-capacitor C11 can be used for stabilizing the potential of the node N61, and the second sub-capacitor C22 can be used for stabilizing the potential of the node N62.

In some embodiments, referring to FIG. 4 and FIG. 5, the first trace structure 31 includes the first sub-portion 311 which overlaps with the first shielding structure 41 along the thickness direction of the display panel. The second trace structure 32 includes the second sub-portion 322 which overlaps with the second shielding structure 42 along the thickness direction of the display panel; and the area of the first sub-portion 311 is greater than the area of the second sub-portion 322.

It should be noted that in order to clearly illustrate the first sub-capacitor and the second sub-capacitor, the structure of the second metal layer M2 is hidden in FIG. 5.

As an example, the first trace structure 31 includes the first corner portion, the part which extends along the first direction X, and the part which extends along the second direction Y, and the parts of the first trace structure 31 which extend along the two directions are connected to each other at the first corner portion of the first trace structure. The first sub-portion 311 is the first corner portion of the first trace structure 31. The second trace structure 32 includes the second corner portion, the part which extends along the first direction X, and the part which extends the second direction Y, and the parts of the second trace structure 32 which extend along the two directions are connected to each other at the second corner portion of the second trace structure. The second sub-portion 322 is the second corner portion of the second trace structure 32.

In an example, the line width of the first sub-portion 311 is greater than the line width of the second sub-portion 322. For example, the line width of the first sub-portion 311 along the first direction X is greater than the line width of the second sub-portion 322 along the first direction X, and/or the line width of the first sub-portion 311 along the second direction Y is greater than the line width of the second sub-portion 322 along the second direction Y.

In this embodiment, the first sub-portion 311 is used as the lower plate of the first sub-capacitor C11, the second sub-portion 322 is used as the lower plate of the second sub-capacitor C22, and the area of the first sub-portion 311 is greater than the area of the second sub-portion 322, so that the overlapped area of two plates of the first sub-capacitor C11 may be greater than the overlapped area of two plates of the second sub-capacitor C22.

In some embodiments, as shown in FIG. 4, the shape and the area of the orthographic projection of the first shielding structure 41 on the plane where the display panel is located are the same as the shape and the area of the orthographic projection of the second shielding structure 42 on the plane where the display panel is located is.

In this embodiment, the shape and the area of the first shielding structure 41 are the same as the shape and the area of the second shielding structure 42, so that the area of the first sub-portion 311 only needs to be designed to be greater than the area of the second sub-portion 322, as such the object that the overlapped area of two plates of the first sub-capacitor C11 is greater than the overlapped area of two plates of the second sub-capacitor C22 may be achieved by fewer structural modifications.

In some embodiments, referring to FIG. 2, FIG. 6, and FIG. 7, the first double-gate transistor 11 includes the first reset transistor M4 which is connected between the gate of the first driving transistor M3 and the reset signal line Vref, and the second double-gate transistor 22 includes the second reset transistor T4 which is connected between the gate of the second driving transistor T3 and the reset signal line Vref. The first capacitor C1 includes the third sub-capacitor C13, and the second capacitor C2 includes the fourth sub-capacitor C24. The first connection structure 31*a* includes the third trace structure 33, the second connection structure 32*b* includes the fourth trace structure 34, and the reset signal line Vref includes the bulk portion ref0, the third sub-portion ref1, and the fourth sub-portion ref2. The first transistor 111 (that is, the transistor M4_1) and the second transistor 112 (that is, the transistor M4_2) in the first reset transistor M4 are connected by the third trace structure 33; and the third sub-portion ref1 and the third trace structure 33 at least partially overlap along the thickness direction of the display panel to form the third sub-capacitor C13. The third transistor 223 (that is, the transistor T4_1) and the fourth transistor (that is, the transistor T4_2) in the second reset transistor T4 are connected by the fourth trace structure 34; and the fourth sub-portion ref2 and the fourth trace structure 34 at least partially overlap along the thickness direction of the display panel to form the fourth sub-capacitor C24.

In an example, the third trace structure 33 and the fourth trace structure 34 are located in the semiconductor layer 01.

The bulk portion ref0, the third sub-portion ref1, and the fourth sub-portion ref2 of the reset signal line Vref are located in the capacitive metal layer MC.

The parts of the third sub-portion ref1 which overlap with the third trace structure 33 can be used as two plates of the third sub-capacitor C13, respectively, and the parts of the fourth sub-portion ref2 which overlap with the fourth trace structure 34 can be used as two plates of the fourth sub-capacitor C24, respectively.

In an example, the reset signal lines Vref may be used for transmitting the fixed negative voltages, so that the third sub-capacitor C13 can be used for stabilizing the potential of the node N51, and the fourth sub-capacitor C24 can be used for stabilizing the potential of the node N52.

In some embodiments, referring to FIG. 6 and FIG. 7, the reset signal lines Vref extend along the first direction X, and along the second direction Y, the line width of the third sub-portion ref1 is greater than the line width of the fourth sub-portion ref2.

It should be noted that in order to clearly illustrate the third sub-capacitor and the fourth sub-capacitor, the structure of the second metal layer M2 is hidden in FIG. 7.

In an example, along the first direction X, the line width of the third sub-portion ref1 is equal to the line width of the fourth sub-portion ref2.

In this example, the third sub-portion ref1 is used as the upper plate of the third sub-capacitor C13, the fourth sub-portion ref2 is used as the upper plate of the fourth sub-capacitor C24, and the line width of the third sub-portion ref1 along the second direction Y is greater than the line width of the fourth sub-portion ref2 along the second direction Y, so that the overlapped area of two plates of the third sub-capacitor C13 is greater than the overlapped area of two plates of the fourth sub-capacitor C24.

In some embodiments, as shown in FIG. 4, the shape and the area of the orthographic projection of the third trace structure 33 on the plane where the display panel is located are the same as the shape and the area of the orthographic projection of the fourth trace structure 34 on the plane where the display panel is located.

In this embodiment, the shape and the area of the third trace structure 33 are the same as the shape and the area of the fourth trace structure 34, so that the line width of the third sub-portion ref1 along the second direction Y only needs to be designed to be greater than the line width of the fourth sub-portion ref2 along the second direction Y, as such the object that the overlapped area of two plates of the third sub-capacitor C13 is greater than the overlapped area of two plates of the fourth sub-capacitor C24 may be achieved by fewer structural modifications.

In some embodiments, as shown in FIG. 2, the first transistor 111 is connected between the gate of the first driving transistor M3 and the second transistor 112, and the third transistor 223 is connected between the gate of the second driving transistor T3 and the fourth transistor 224. The channel area of the first transistor 111 is less than the channel area of the third transistor 223. Referring to FIG. 2, FIG. 8, FIG. 9, and FIG. 10, the structures of the capacitive metal layer MC and the second metal layer M2 are hidden in FIG. 9 and FIG. 10, and the dimensions of the channel of the first transistor 111 and the channel of the third transistor 223 along the semiconductor layer B may be designed differently, so that the channel area of the first transistor 111 is less than the channel area of the third transistor 223.

Figure 8:
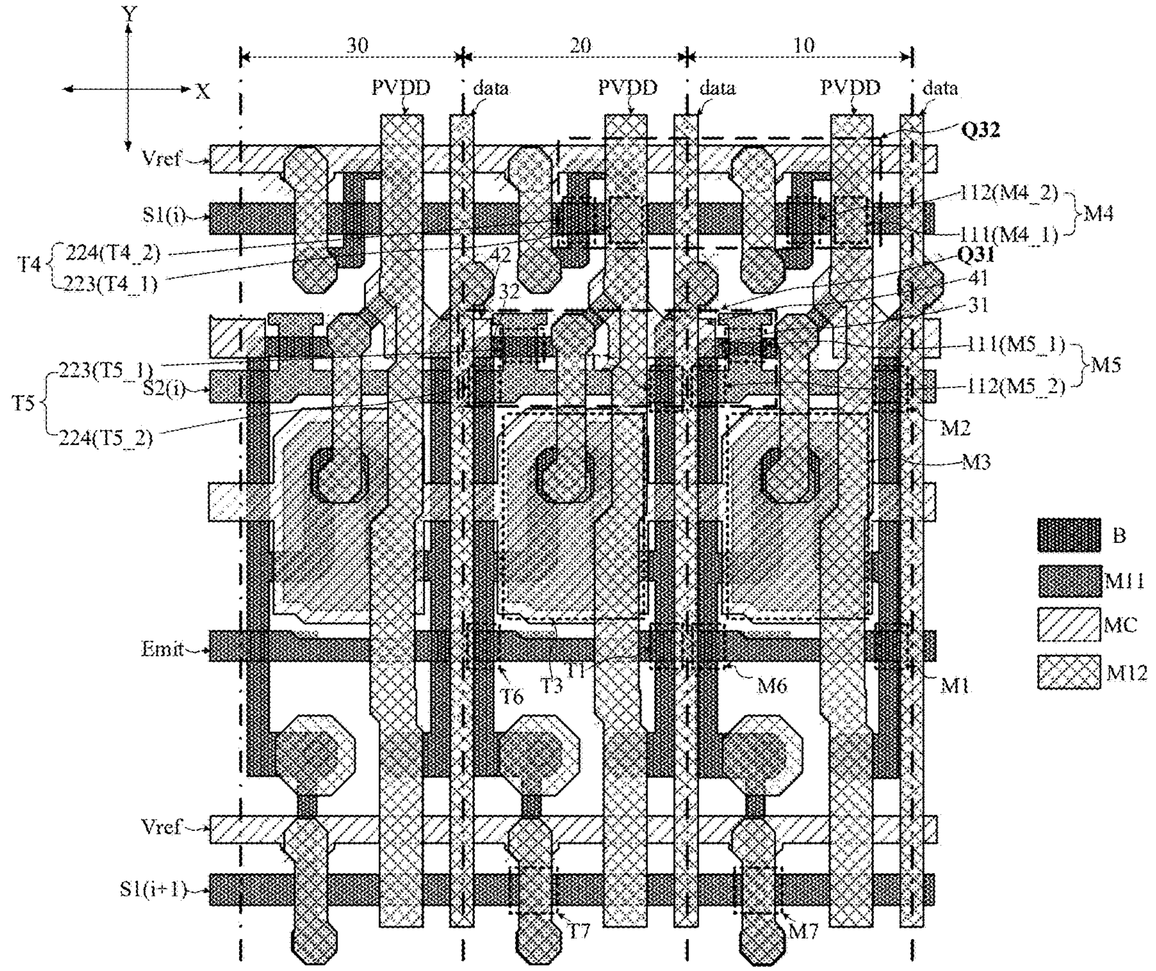
FIG. 8 shows yet another schematic structural view of a layout of a partial area of a display panel according to embodiments of the present application.
Figure 9:
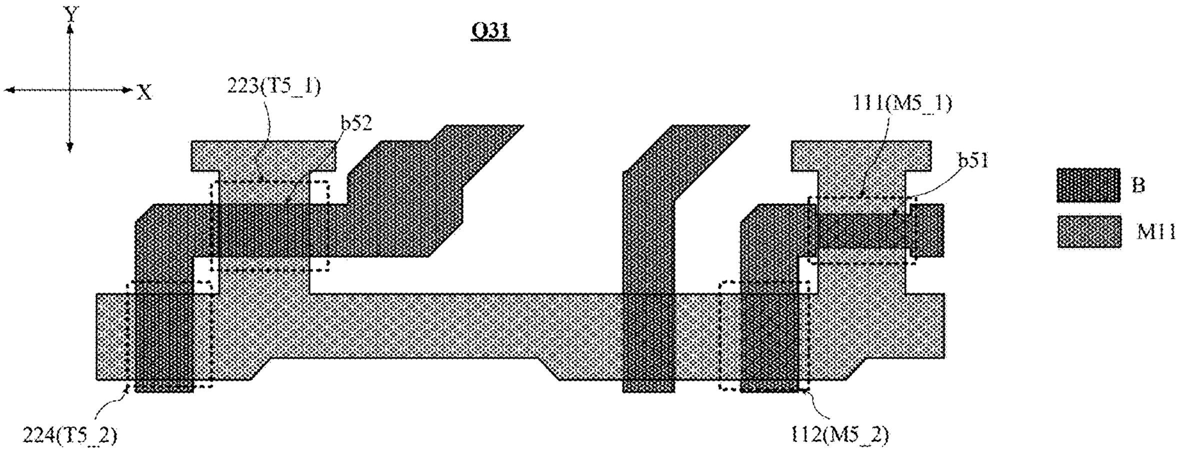
FIG. 9 shows an enlarged schematic view of partial structures in area Q31 in FIG. 8.

As an example, referring to FIG. 8 and FIG. 9, the first transistor 111 includes the transistor M5_1, the third transistor 223 includes the transistor T5_1, the length of the channel b51 of the transistor M5_1 along the second direction Y is less than the length of the channel b52 of the transistor T5_1 along the second direction Y, and the width of the channel b51 of the transistor M5_1 along the first direction X is equal to the width of the channel b52 of the transistor T5_1 along the first direction X.

Figure 10:
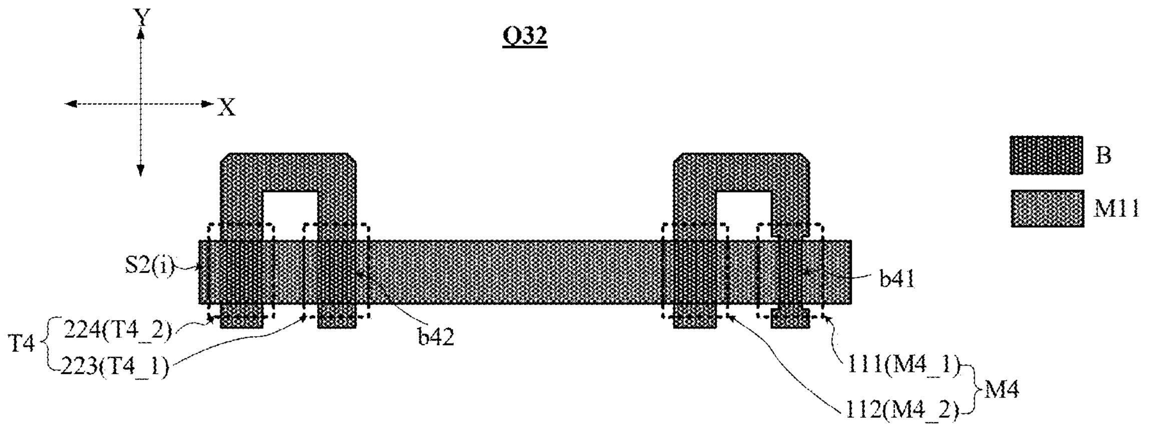
FIG. 10 shows an enlarged schematic view of partial structures in area Q32 in FIG. 8.

As an example, referring to FIG. 8 and FIG. 10, the first transistor 111 includes the transistor M4_1, the third transistor 223 includes the transistor T4_1, the length of the channel b41 of the transistor M4_1 along the second direction Y is equal to the length of the channel b42 of the transistor T4_1 along the second direction Y, and the width of the channel b41 of the transistor M4_1 along the first direction X is less than the width of the channel b42 of the transistor T4_1 along the first direction X.

In some embodiments, as shown in FIG. 2, the first transistor 111 is connected between the gate of the first driving transistor M3 and the second transistor 112, and the third transistor 223 is connected between the gate of the second driving transistor T3 and the fourth transistor 224. The channel length of the second transistor 112 is less than the channel length of the fourth transistor 224. Referring to FIG. 2, FIG. 11, FIG. 12, and FIG. 13, the structures of the capacitive metal layer MC and the second metal layer M2 are hidden in FIG. 12 and FIG. 13, and the dimensions of the channel of the second transistor 112 and the channel of the fourth transistor 224 along the semiconductor layer B may be designed differently, so that the channel length of the second transistor 112 is less than the channel length of the fourth transistor 224.

Figure 11:
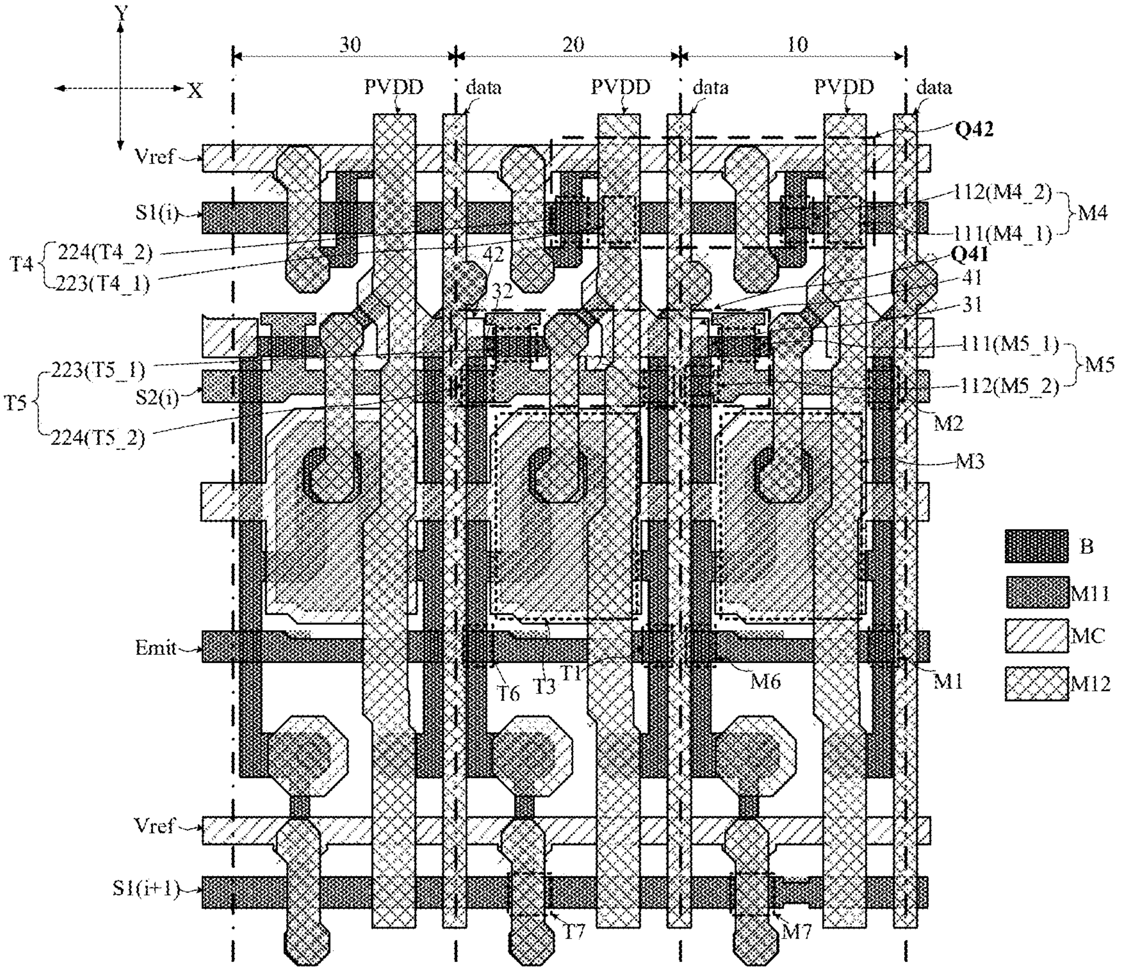
FIG. 11 shows yet another schematic structural view of a layout of a partial area of a display panel according to embodiments of the present application.
Figure 12:
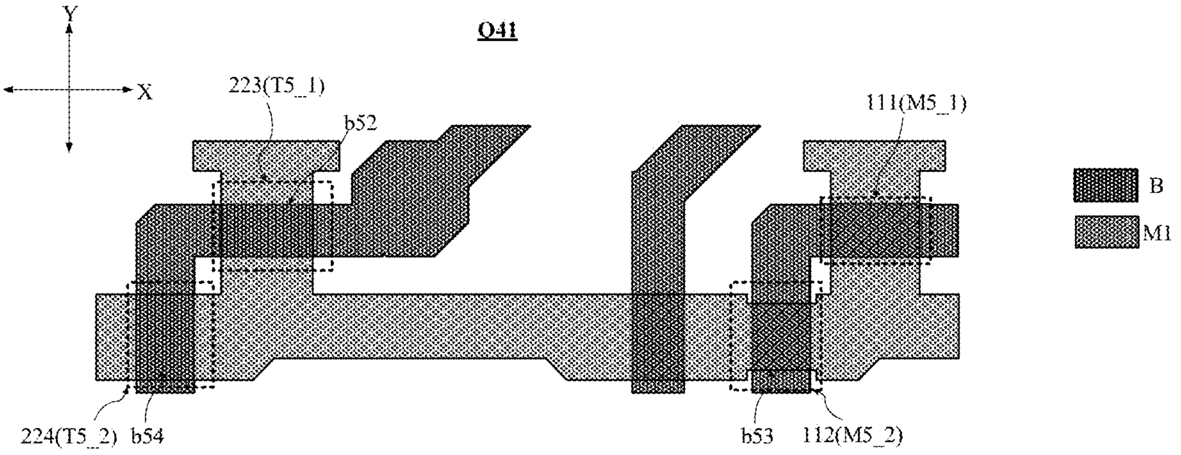
FIG. 12 shows an enlarged schematic view of partial structures in area Q41 in FIG. 11.

In an example, referring to FIG. 11 and FIG. 12, the second transistor 112 includes the transistor M5_2, the fourth transistor 224 includes the transistor T5_2, the length of the channel b53 of the transistor M5_2 along the second direction Y is less than the length of the channel b54 of the transistor T5_2 along the second direction Y, and the width of the channel b53 of the transistor M5_2 along the first direction X is equal to the width of the channel b54 of the transistor T5_2 along the first direction X.

Figure 13:
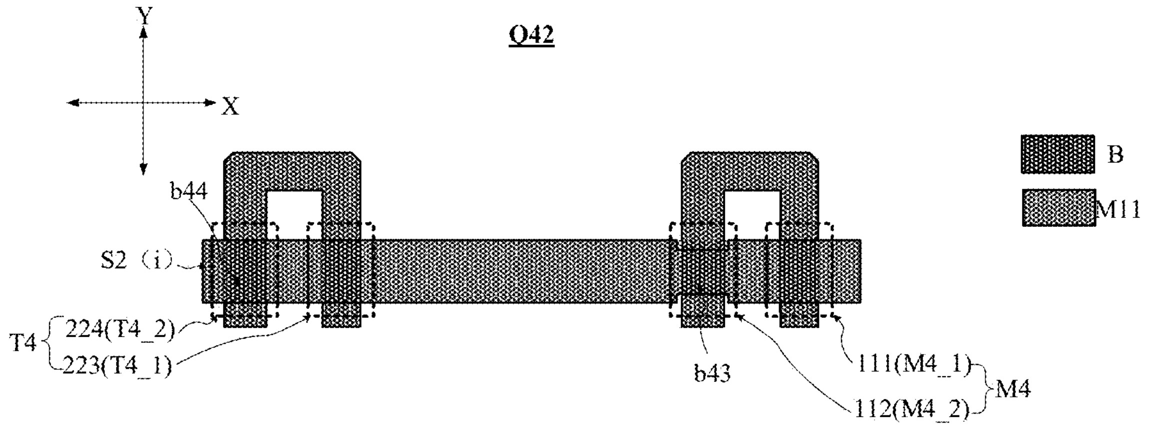
FIG. 13 shows an enlarged schematic view of partial structures in area Q42 in FIG. 11.

In an example, referring to FIG. 11 and FIG. 13, the second transistor 112 includes the transistor M4_2, the fourth transistor 224 includes the transistor T4_2, the length of the channel b43 of the transistor M4_2 along the second direction Y is less than the length of the channel b44 of the transistor T4_4 along the second direction Y, and the width of the channel b43 of the transistor M4_2 along the first direction X is equal to the width of the channel b44 of the transistor T4_4 along the first direction X.

In some embodiments, as shown in FIG. 2, the first pixel circuit 10 includes the first storage capacitor Cst1 which is connected between the gate of the first driving transistor M3 and the first power supply line PVDD; the second pixel circuit 20 includes the second storage capacitor Cst2 which is connected between the gate of the second driving transistor T3 and the first power supply line PVDD; and the overlapped area of two plates of the first storage capacitor Cst1 is greater than the overlapped area of two plates of the second storage capacitor Cst2.

The example is still given in which the first sub-pixels are the blue sub-pixels, and the second sub-pixels are the red sub-pixels or the green sub-pixels, and in this embodiment, the first storage capacitor Cst1 can be used for maintaining the stability of the potential of the gate of the first driving transistor M3, the second storage capacitor Cst2 can be used for maintaining the stability of the potential of the gate of the second driving transistor T3, and the overlapped area of two plates of the first storage capacitor Cst1 is relatively great, so that the capacitance of the first storage capacitor Cst1 is relatively great, the first storage capacitor Cst1 has the greater ability to maintain the potential, the leakage current of the gate of the first driving transistor M3 is reduced, and the leakage current of the gate of the first driving transistor in the blue sub-pixel tends to be the same as the leakage current of the gate of the second driving transistor in the red/green sub-pixel, thereby reducing the reddishness.

Figure 14:
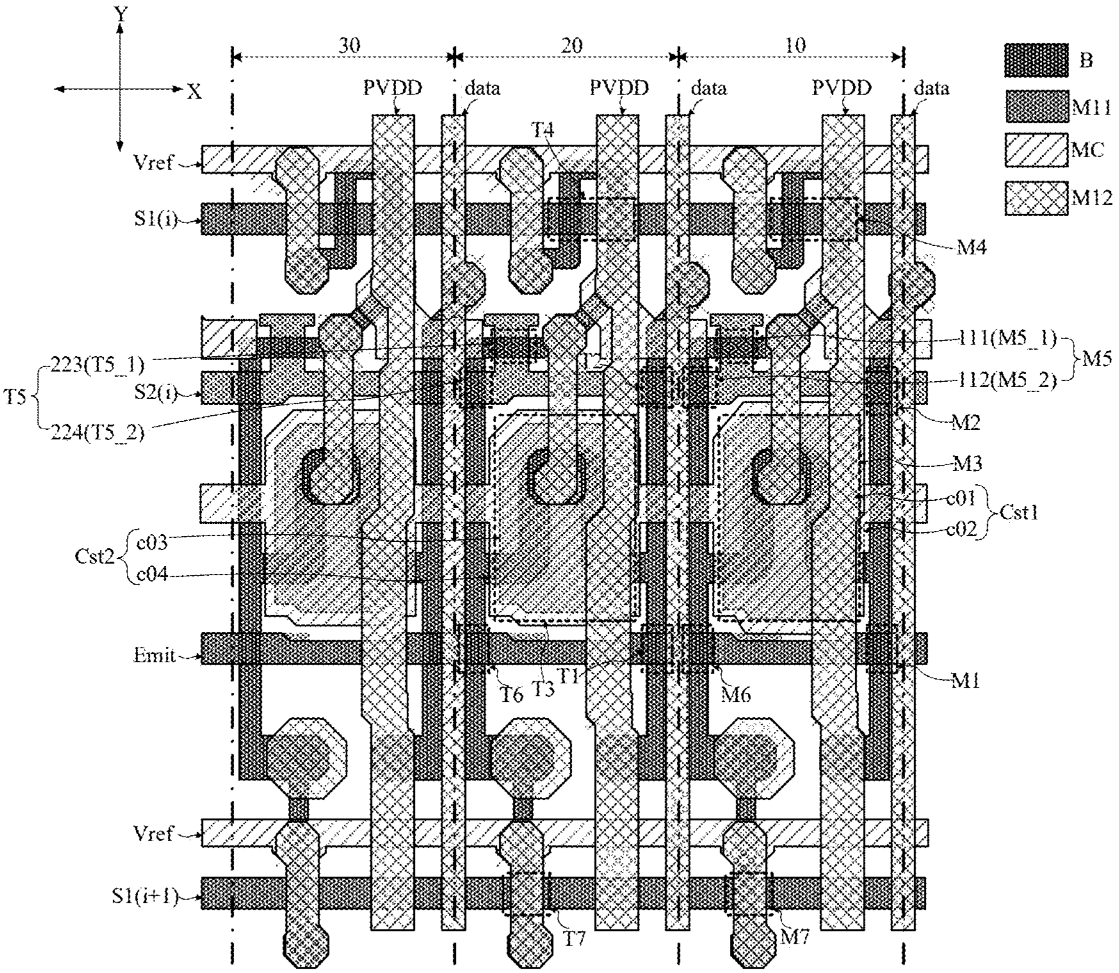
FIG. 14 shows yet another schematic structural view of a layout of a partial area of a display panel according to embodiments of the present application.

As an example, referring to FIG. 2 and FIG. 14, the first storage capacitor Cst1 includes the first plate c01 and the second plate c02, the second storage capacitor Cst2 includes the third plate c03 and the fourth plate c04, the first plate c01 and the third plate c03 are located in the first metal layer M1, the second plate c02 and the fourth plate c04 are located in the capacitive metal layer MC, the area of the first plate c01 is greater than the area of the third plate c03, and the area of the second plate c02 is greater than the area of the fourth plate c04, so that the overlapped area of two plates of the first storage capacitor Cst1 is greater than the overlapped area of two plates of the second storage capacitor Cst2.

Figure 15:
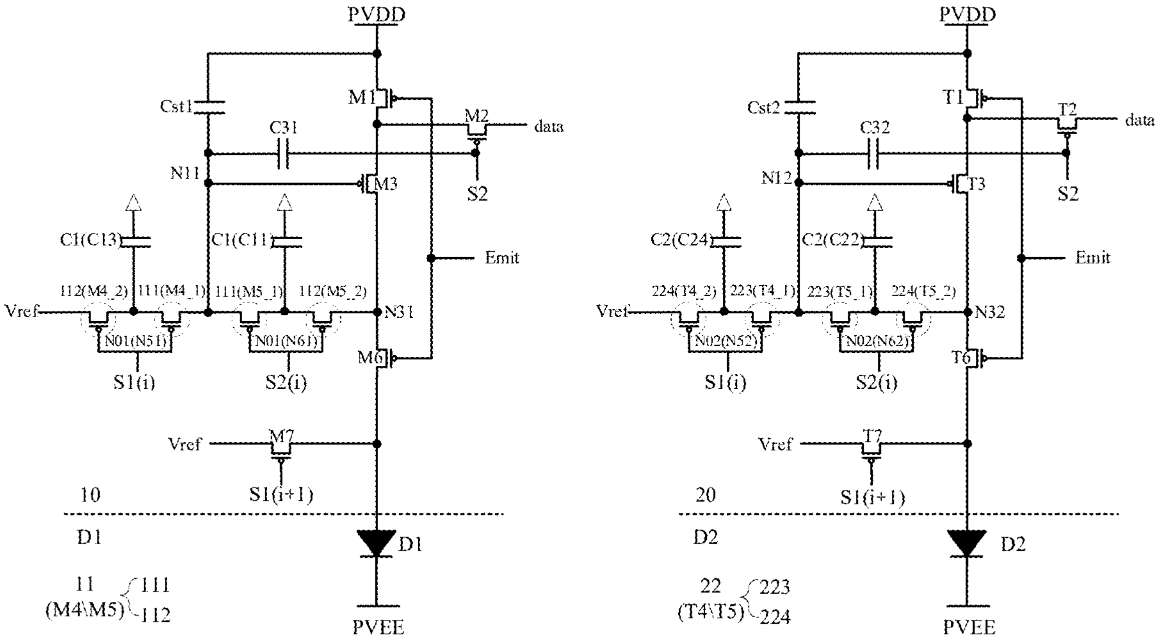
FIG. 15 shows another topological schematic structural view of pixel circuits in a display panel according to embodiments of the present application.

In some embodiments, as shown in FIG. 15, the first pixel circuit 10 includes the first coupling capacitor C31 which is connected between the gate of the first driving transistor M3 and the scanning signal line S2(*i*). The second pixel circuit 20 includes the second coupling capacitor C32 which is connected between the gate of the second driving transistor T3 and the scanning signal line S2(*i*). The capacitance value of the first coupling capacitor C31 is greater than the capacitance value of the second coupling capacitor C32.

In this embodiment, the scanning signal line connected to the coupling capacitor may refer to the scanning signal line for controlling writing of the data signal. For example, the first pixel circuit 10 includes the transistor M2, the first electrode of the transistor M2 is connected to the data signal line, and the second electrode of the transistor M2 is connected to the first electrode of the first driving transistor M3. The transistor M2 is configured to write the data signal to the gate of the first driving transistor M3. The second pixel circuit 20 includes the transistor T2, the first electrode of the transistor T2 is connected to the data signal line, and the second electrode of the transistor T2 is connected to the first electrode of the second driving transistor T3. The transistor T2 is configured to write the data signal to the gate of the second driving transistor T3. The gates of the transistor M2 and the transistor T2 are connected to the scanning signal lines S2(*i*).

In order to better explain the effect of the differentiated design of the coupling capacitor, referring to Table 1 which exemplifies two cases, case 1 is a case in which the first coupling capacitor C31 and the second coupling capacitor C32 are not provided, and case 2 is a case in which the capacitance value of the first coupling capacitor C31 is greater than the capacitance value of the second coupling capacitor C32.

In addition, the node N1 and the node N6 in Table 1 represent the node N11 and the node N61 in the first sub-pixel and the node N12 and the node N62 in the second sub-pixel, respectively.

N61 of the first sub-pixel is 4.5V, and the coupling jump voltage of the node N62 of the second sub-pixel is 4V. An example is given in which the coupling ratio of the scanning signal line S2(*i*) to the node N6 is 80% of the total capacitance of the node N6, the voltage of the N6 by the coupling of the scanning signal line S2(*i*) is the coupling jump voltage of the N6 multiplied by 80% plus the voltage of the N6 in the writing phase, the voltage of the node N61 of the first sub-pixel by the coupling of the scanning signal line S2(*i*) is 5.1V (4.5*0.8+1.5=5.1), and the voltage of the node N62 of the second sub-pixel by the coupling of the scanning signal line S2(*i*) is 5.2V (4*0.8+2=5.2). The voltage difference between the node N61 and the node N11 of the first sub-pixel in the light-emitting phase is 3.6V (5.1-1.5=3.6), and the voltage difference between the node N62 and the node N12 of the second sub-pixel in the light-emitting phase is 3.2V (5.2-2=3.2). Finally, the difference between the voltage difference between the node N11 and the node N61 of the first sub-pixel and the voltage difference between the node N12 and the node N62 of the second sub-pixel is 0.4V.

In case 2, the voltage of the node N11 of the first sub-pixel needs to reach 1.5V in the light-emitting phase, and the voltage of the node N12 of the second sub-pixel needs to reach 2V in the light-emitting phase; since the capacitance value of the first coupling capacitor C31 is greater than the capacitance value of the second coupling capacitor C32, the node N11 and the node N12 are pulled up by the coupling of the scanning signal lines S2(*i*), and the node N11 of the first sub-pixel is pulled up even more, the data voltage

TABLE 1

| | | voltage of N1 in light-emitting phase | written data voltage | voltages of N6 and N1 in writing phase | high-level of S2 | coupling jump voltage of N6 | voltage of N6 by coupling of S2 | voltage difference between N6 and N1 in light-emitting phase | difference between first sub-pixel and second sub-pixel |
|---|---|---|---|---|---|---|---|---|---|
| case 1 | second sub-pixel | 2 | 2 | 2 | 6 | 4 | 5.2 | 3.2 | 0.4 |
| | first sub-pixel | 1.5 | 1.5 | 1.5 | 6 | 4.5 | 5.1 | 3.6 | |
| case 2 | second sub-pixel | 2 | 1.5 | 1.5 | 6 | 4.5 | 5.1 | 3.1 | 0.3 |
| | first sub-pixel | 1.5 | 0.5 | 0.5 | 6 | 5.5 | 4.9 | 3.4 | |

Referring to FIG. 15 and Table 1, for example, for case 1, the voltage of the node N11 of the first sub-pixel needs to reach 1.5V in the light-emitting phase, and the voltage of the node N12 of the second sub-pixel needs to reach 2V in the light-emitting phase; since there is no coupling capacitor, neither the node N11 nor the node N12 will be pulled up by the coupling of the scanning signal lines S2(*i*); with the threshold voltage of the transistors ignored, the data voltages written to the first sub-pixel and the second sub-pixel are 1.5V and 2V, respectively. In the writing phase, with the threshold voltage of the transistors ignored, the voltages of the node N61 and the node N11 of the first sub-pixel are 1.5V, and the voltages of the node N62 and the node N12 of the second sub-pixel are 2V For example, the high level (VGH) voltage on the scanning signal line S2(*i*) is 6V, and after the signal of the scanning signal line S2(*i*) jumps from the low level to the high level, the difference between the high level of the scanning signal line S2(*i*) and the level of the node N6 in the writing phase is the coupling jump voltage of the N6, the coupling jump voltage of the node written to the first sub-pixel may be smaller, for example, the data voltage written to the first sub-pixel is 0.5V, and the data voltage written to the second sub-pixel is 2V. In the writing phase, the threshold voltage of the transistor is ignored, the voltages of the node N61 and the node N11 of the first sub-pixel are 0.5V, and the voltages of the node N62 and the node N12 of the second sub-pixel are 1.5V. The coupling jump voltage of the node N61 of the first sub-pixel is 5.5V, and the coupling jump voltage of the node N62 of the second sub-pixel is 4.5V The example is still given in which the coupling ratio of the scanning signal line S2(*i*) to the node N6 is 80% of the total capacitance of the node N6, the voltage of the node N61 of the first sub-pixel by the coupling of the scanning signal line S2(*i*) is 4.9V (5.5*0.8+0.5=4.9), and the voltage of the node N62 of the second sub-pixel by the coupling of the scanning signal line S2(*i*) is 5.1V (4.5*0.8+1.5=5.1). The voltage difference between the node N61 and the node N11 of the first sub-pixel in the light-emitting phase is 3.4V (4.9-1.5=3.4), and the voltage difference between the node N62 and the node N12 of the second sub-pixel in the light-emitting phase is 3.1V (5.1−2=3.1). Finally, the difference between the voltage difference between the node N11 and the node N61 of the first sub-pixel and the voltage difference between the node N12 and the node N62 of the second sub-pixel is 0.3V.

It may be seen that since the capacitance value of the first coupling capacitor C31 is greater than the capacitance value of the second coupling capacitor C32, the leakage current of the gate of the first driving transistor in the first sub-pixel tends to be the same as the leakage current of the gate of the second driving transistor in the second sub-pixel, thereby reducing the color cast.

Figure 16:
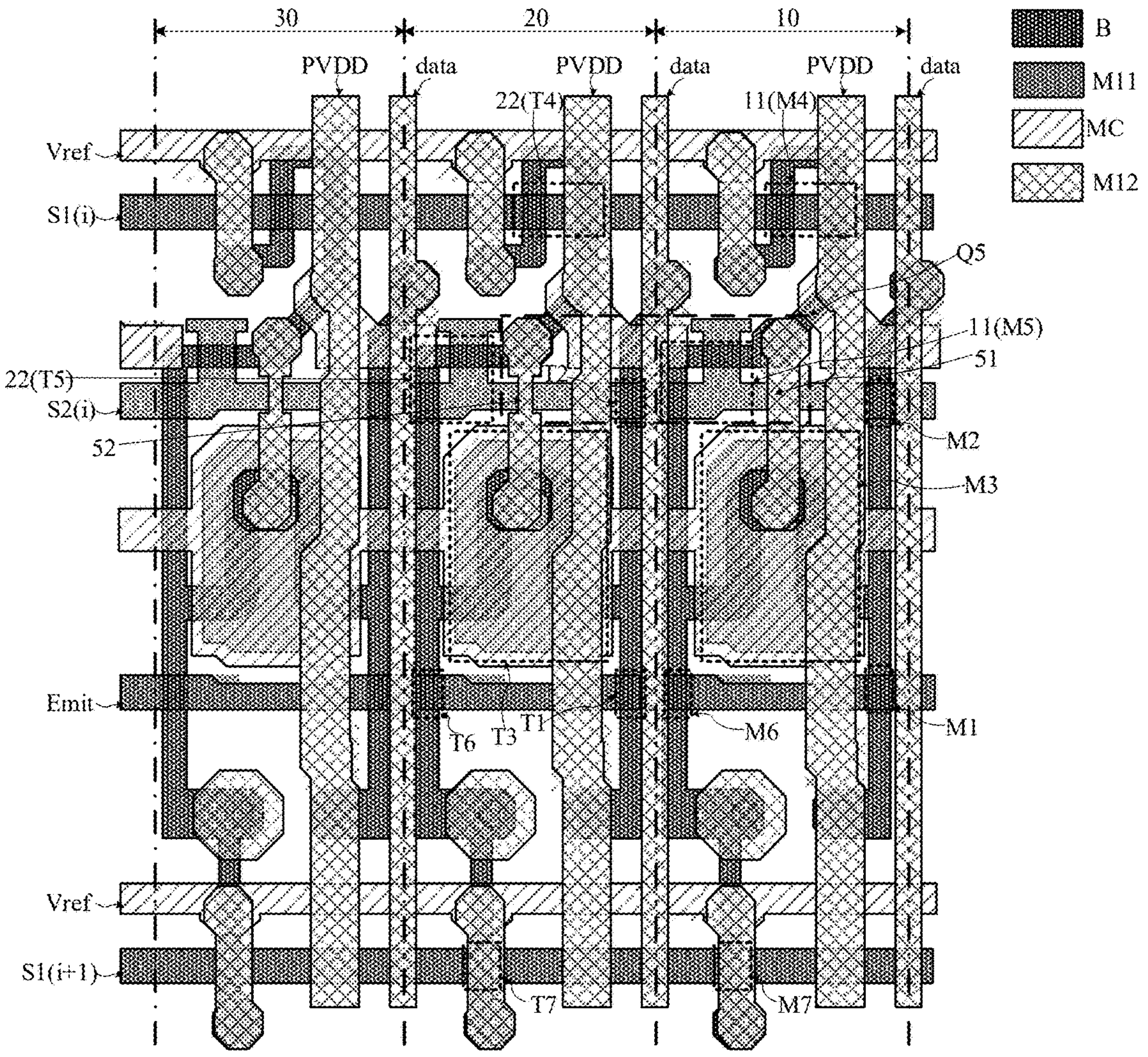
FIG. 16 shows yet another schematic structural view of a layout of a partial area of a display panel according to embodiments of the present application.
Figure 17:
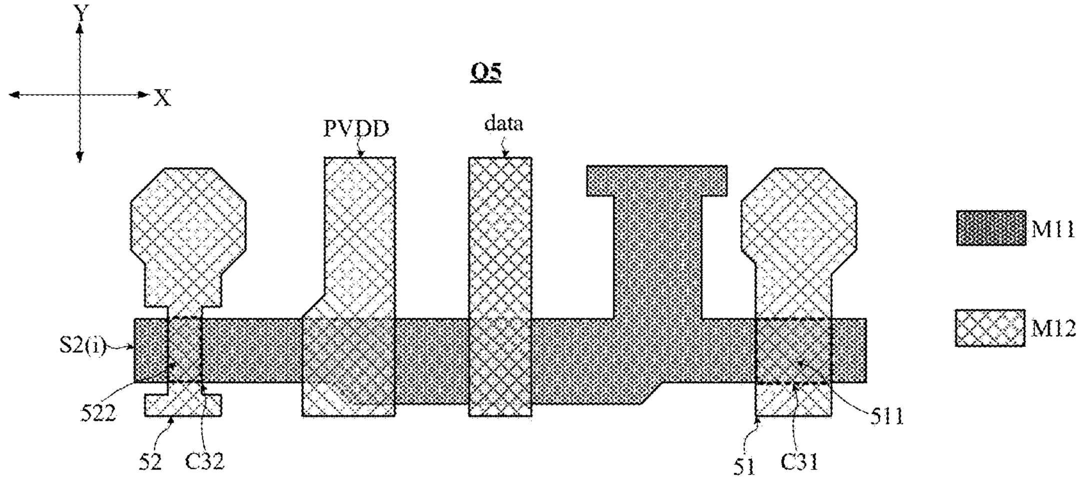
FIG. 17 shows an enlarged schematic view of partial structures in area Q5 in FIG. 16.

In some embodiments, referring to FIG. 15, FIG. 16, and FIG. 17, the display panel includes the first connection portion 51 and the second connection portion 52, the first connection portion 51 is connected to the gate of the first driving transistor M3 and the first double-gate transistor 11, and the second connection portion 52 is connected to the gate of the second driving transistor T3 and the second double-gate transistor 22. The first connection portion 51 and the scanning signal line S2(*i*) at least partially overlap along the thickness direction of the display panel to form the first coupling capacitor C31, and the second connection portion 52 and the scanning signal line S2(*i*) at least partially overlap along the thickness direction of the display panel to form the second coupling capacitor C32.

For example, the first connection portion 51 and the second connection portion 52 are located in the second metal layer M2, one end of the first connection portion 51 is connected to the first double-gate transistor 11 by the via, and the other end of the first connection portion 51 is connected to the gate of the first driving transistor M3 by the via. One end of the second connection portion 52 is connected to the second double-gate transistor 12 by the via, and the other end of the second connection portion 52 is connected to the gate of the second driving transistor T3 by the via. The first connection portion 51 and the second connection portion 52 extend along the second direction Y.

The scanning signal line S2S2(*i*) is located in the first metal layer M1 and extend along the first direction X. Different segments on the scanning signal line S2(*i*) overlap with the first connection portion 51 and the second connection portion 52, respectively.

The parts of the first connection portion 51 which overlap with the scanning signal line S2 can be used as two plates of the first coupling capacitor C31, respectively, and the parts of the second connection portion 52 which overlap with the scanning signal line S2(*i*) can be used as two plates of the second coupling capacitor C32, respectively.

In some embodiments, as shown in FIG. 17, the structures of the semiconductor layer B and the capacitive metal layer MC are hidden in FIG. 17, the first connection portion 51 includes the first connection segment 511 which overlaps with the scanning signal line S2(*i*) along the thickness direction of the display panel; and the second connection portion 52 includes the second connection segment 522 which overlaps with the scanning signal line S2(*i*) along the thickness direction of the display panel. The scanning signal line S2(*i*) extends along the first direction X, the first connection segment 511 and the second connection segment 522 extend along the second direction Y, and the first direction X intersects the second direction Y.

In an example, along the first direction X, the line width of the first connection segment 511 is greater than the line width of the second connection segment 522. Along the second direction Y, the line width of the first connection segment 511 is equal to the line width of the second connection segment 522. In this example, the area of the first connection segment 511 is greater than the area of the second connection segment 522, so that the overlapped area of two plates of the first coupling capacitor C31 is greater than the overlapped area of two plates of the second coupling capacitor C32, and thus, the capacitance value of two plates of the first coupling capacitor C31 is greater than the capacitance value of two plates of the second coupling capacitor C32.

For example, the second connection portion 52 may be designed to have a reduced line width only at the part which overlaps with the scanning signal line S2(*i*).

Figure 18:
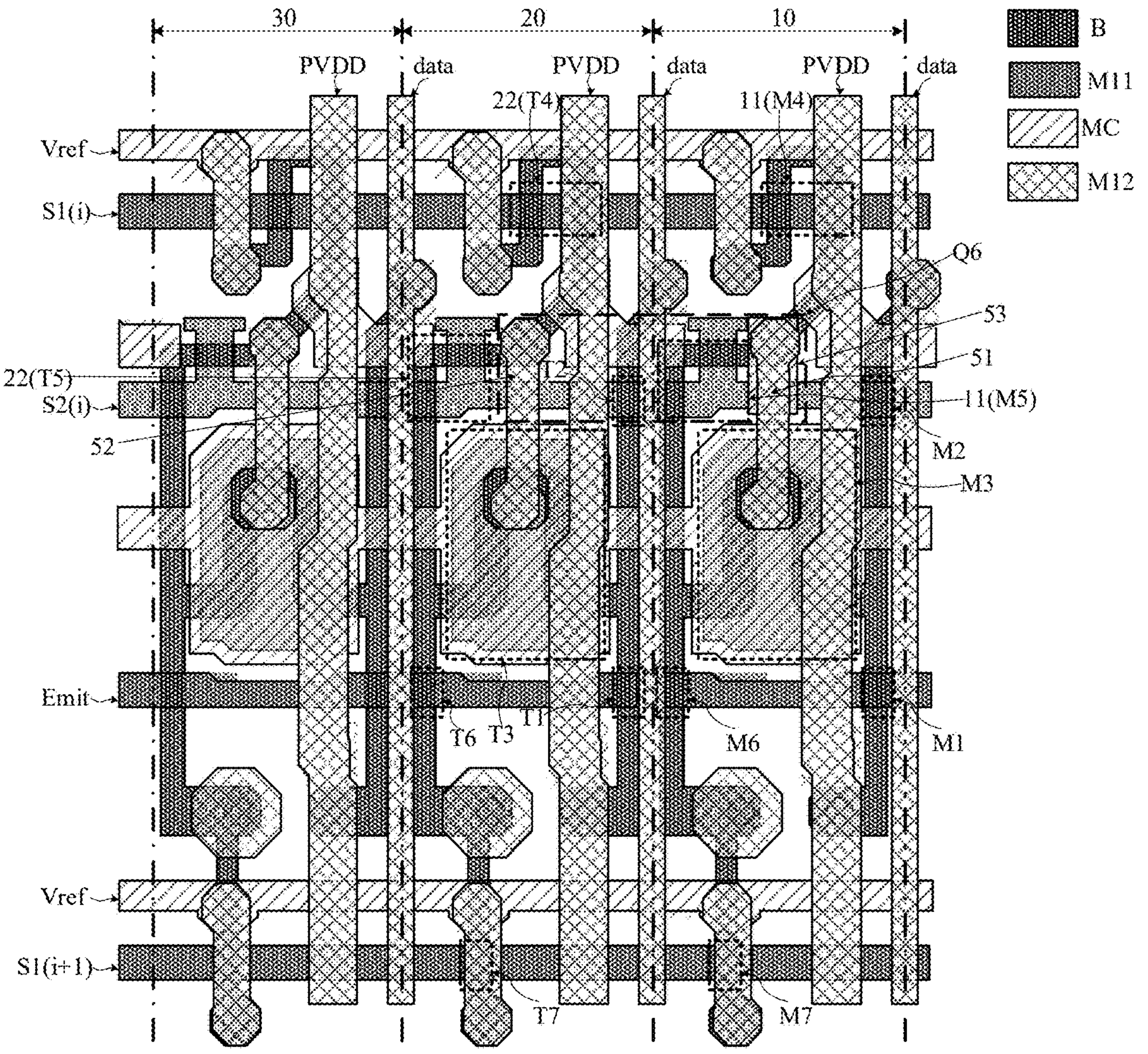
FIG. 18 shows yet another schematic structural view of a layout of a partial area of a display panel according to embodiments of the present application.
Figure 19:
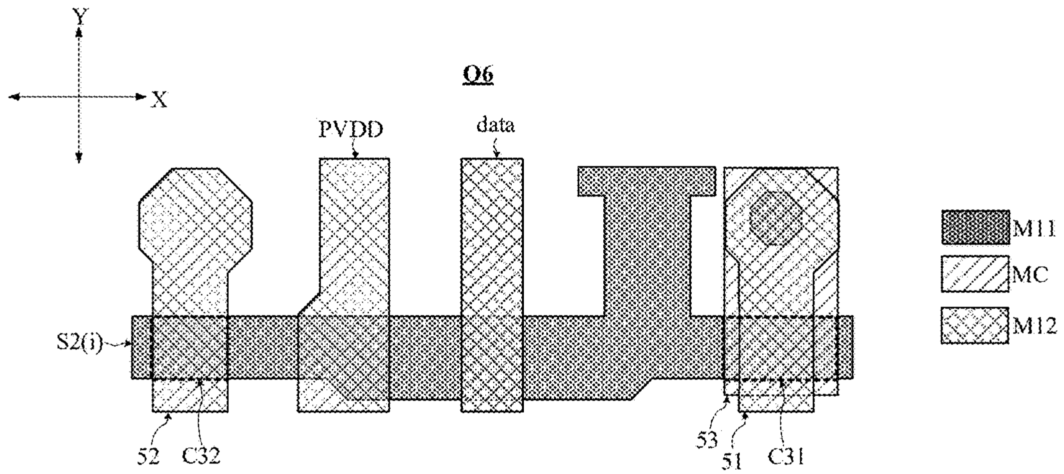
FIG. 19 shows an enlarged schematic view of partial structures in area Q6 in FIG. 18.

In some other embodiments, referring to FIG. 15, FIG. 18, and FIG. 19, the structure of the semiconductor layer B is hidden in FIG. 19, and the display panel further includes the auxiliary portion 53 which is connected to the first connection portion 51 and which at least partially overlaps with the scanning signal line S2(*i*) along the thickness direction of the display panel.

The parts of the first connection portion 51 which overlap with the scanning signal line S2(*i*) may be used as two plates of the first coupling capacitor C31, and the parts of the auxiliary portion 53 which overlap with the scanning signal line S2(*i*) may also be used as two plates of the first coupling capacitor C31, as such the overlapped area of two plates of the first coupling capacitor C31 is increased, so that the overlapped area of two plates of the second coupling capacitor C32 is greater than the overlapped area of the second coupling capacitor C32, and the capacitance value of the first coupling capacitor C31 is greater than the capacitance value of the second coupling capacitor C32.

In some embodiments, as shown in FIG. 19, the auxiliary portion 53 and the first connection portion 51 are located in different film layers. For example, the auxiliary portion 53 is located in the capacitive metal layer MC, and the first connection portion 51 is located in the second metal layer M2.

Figure 20:
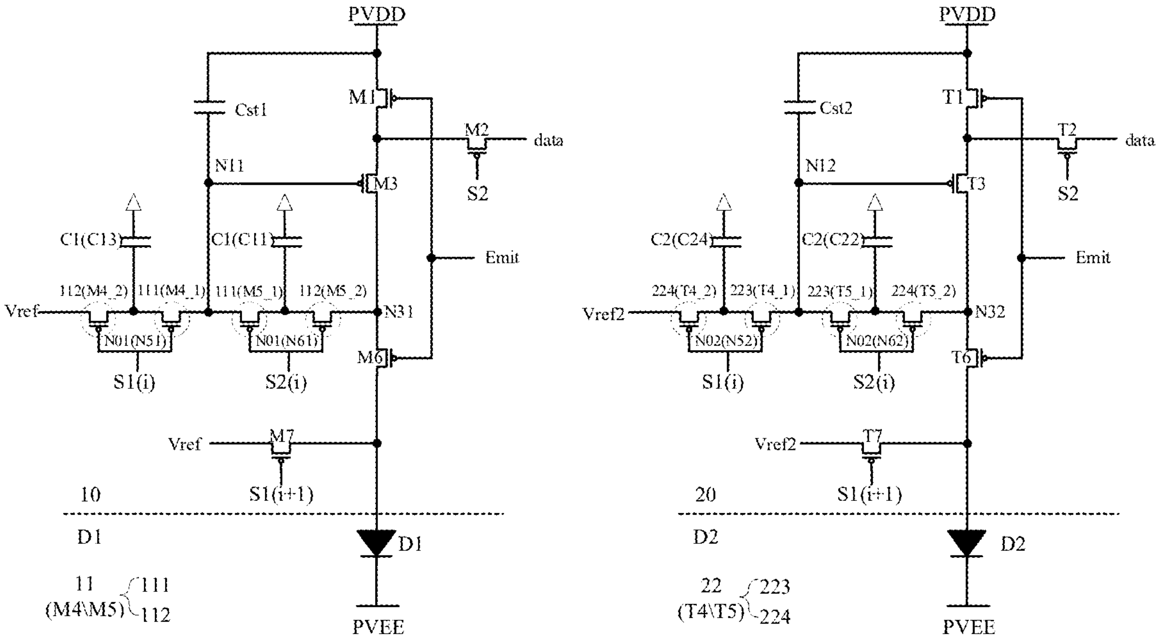
FIG. 20 shows yet another topological schematic structural view of pixel circuits in a display panel according to embodiments of the present application.

In some other embodiments, in order to make the leakage current of the gate of the first driving transistor in the blue sub-pixel tend to be the same as the leakage current of the gate of the second driving transistor in the red/green sub-pixel, the reset voltages of the blue sub-pixel and the red/green sub-pixel may be set differently. As an example, as shown in FIG. 20, the display panel includes the first reset signal lines Vref1 and the second reset signal lines Vref2, the first reset signal lines Vref1 are used for transmitting the first reset voltage, and the second reset signal lines Vref2 are used for transmitting the second reset voltage. At least one first double-gate transistor 11 is configured to write the first reset voltage to the gate of the first driving transistor M3, and at least one second double-gate transistor 22 is configured to write the second reset voltage to the gate of the second driving transistor T3; and the first reset voltage is less than the second reset voltage.

Since under a condition that the white image is displayed, the driving current required for the blue sub-pixel is the greatest, and for the P-type of driving transistor, the potential of the gate of the driving transistor in the blue sub-pixel is the lowest. In this embodiment, the first reset voltage is relatively small, so that the leakage currents between the first reset voltage and the node N51 makes the potential of the node N51 lower than the potential of the node N52, and the difference between the potential of the node N51 in the blue sub-pixel and the potential of the gate of the first driving transistor in the blue sub-pixel is close to the difference between the potential of the node N52 in the red/green sub-pixel and potential of the gate of the second driving transistor in the red/green sub-pixel, and thus the leakage current of the gate of the first driving transistor in the blue sub-pixel tends to be the same as the leakage current of the gate of the second driving transistor in the red/green sub-pixel, thereby reducing the reddishness.

In any one of the above embodiments, the first light-emitting element emits blue light, and the second light-emitting element emits red light or green light. That is, the first sub-pixel is the blue sub-pixel, and the second sub-pixel is the red sub-pixel or the green sub-pixel. The above embodiments may be combined with each other without conflict.

Of course, under a condition that the white image is displayed, if the driving current required for the red sub-pixel is greater than the driving current required for the green sub-pixel, for the P-type of driving transistor, the potential of the gate of the driving transistor in the red sub-pixel is lower than the potential of the gate of the driving transistor in the green sub-pixel, and under this condition, the first sub-pixel may be the red sub-pixel, and the second sub-pixel may be the green sub-pixel.

In some embodiments, as shown in FIG. 1, the plurality of sub-pixels further include the third sub-pixels 3 each including the third pixel circuit 30 and the third light-emitting element D3 which are connected to each other, and the light-emitting colors of the first light-emitting element D1, the second light-emitting element D2, and the third light-emitting element D3 are different one another.

Figure 21:
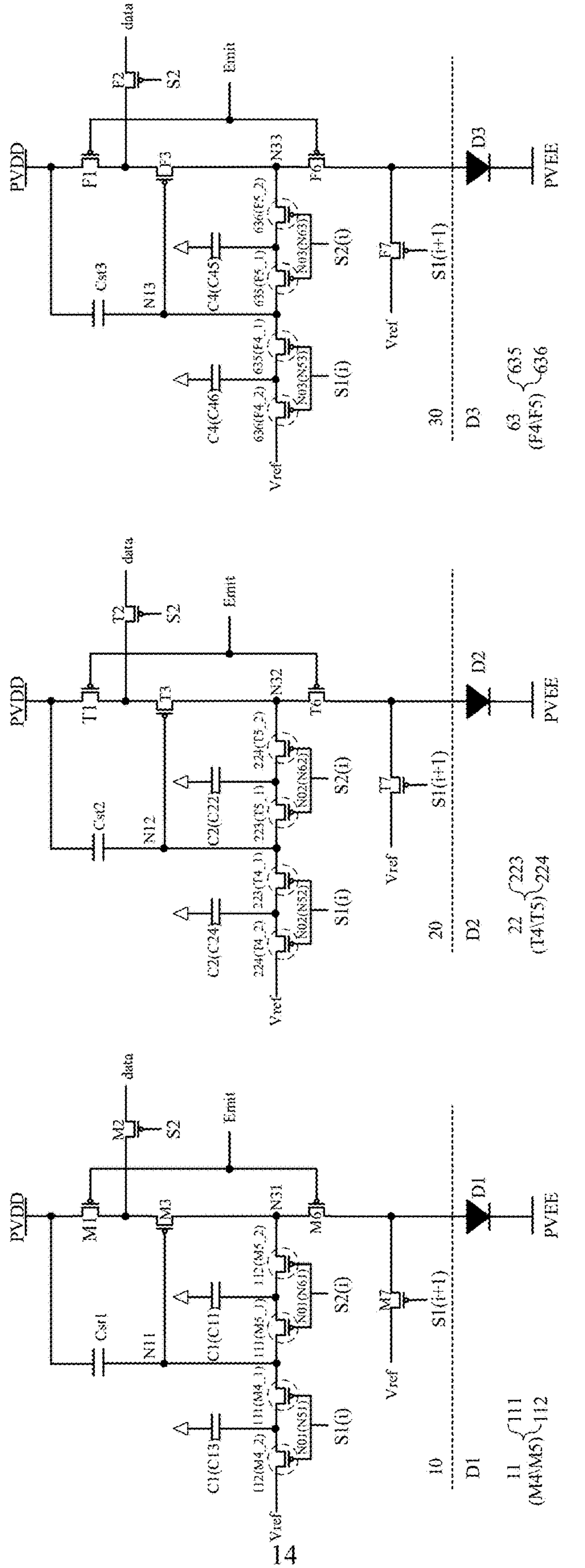
FIG. 21 shows yet another topological schematic structural view of pixel circuits in a display panel according to embodiments of the present application.

As shown in FIG. 21, the third pixel circuit 30 includes the third driving transistor F3 and the third double-gate transistor 63 which is connected to the gate of the third driving transistor F3, the third double-gate transistor 63 includes the fifth transistor 635 and the sixth transistor 636 which are connected to the third node N03, and the third node N03 is connected to one end of the third capacitor C4.

As an example, the overlapped area of two plates of the third capacitor C4 is the same as the overlapped area of two plates of one of the first capacitor C1 and the second capacitor C2.

For example, the first sub-pixel is the blue sub-pixel, the second sub-pixel is the green sub-pixel, the third sub-pixel is the red sub-pixel, the overlapped area of two plates of the third capacitor C4 is the same as the overlapped area of two plates of the second capacitor C2, and the overlapped area of two plates of the first capacitor C1 is the greatest.

In this example, the layout structures of the sub-pixels of two light-emitting colors may be designed to be the same, which may reduce the process difficulty.

In an example, the third capacitor C4 includes the fifth sub-capacitor C45 and the sixth sub-capacitor C46; and in an example, the other end of the fifth sub-capacitor C45 is connected to the first power supply line PVDD, and the other end of the sixth sub-capacitor C46 is connected to the reset signal line Vref.

The overlapped area of two plates of the fifth sub-capacitance C45 is equal to the overlapped area of two plates of the second sub-capacitor C22, and the overlapped area of two plates of the sixth sub-capacitance C46 is equal to the overlapped area of two plates of the fourth sub-capacitor C24.

It should be noted that, in the layouts herein, it is shown that the layout structures of the second pixel circuit and the third pixel circuit are the same way, which is not intended to limit the present application.

As another example, the overlapped area of two plates of the third capacitor C4 is not the same as the overlapped area of two plates of each of the first capacitor C1 and the second capacitor C2.

In this example, the layout structure of the sub-pixel of each light-emitting color may be designed differently based on the light-emitting characteristics of the sub-pixels of various light-emitting colors, thereby balancing the leakage current of the sub-pixel of each light-emitting color, and improving the display effect.

Figure 22:
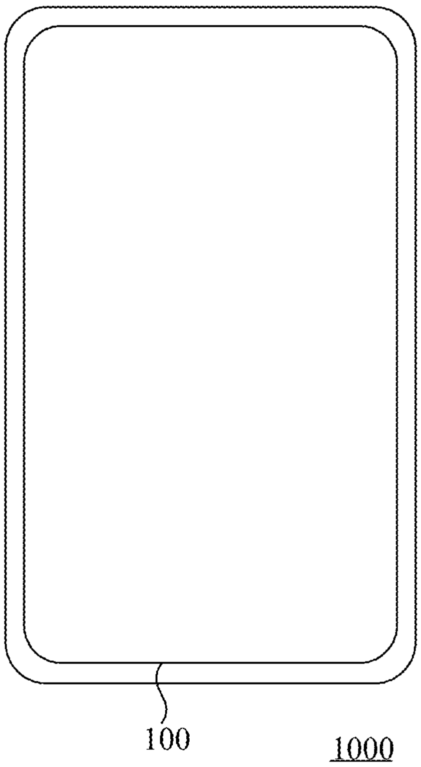
FIG. 22 shows a schematic structural view of a display apparatus according to embodiments of the present application.

The present application further provides a display apparatus including the display panel according to the present application. Referring to FIG. 22, FIG. 22 is a schematic structural view of the display apparatus according to the embodiments of the present application. The display apparatus 1000 provided in FIG. 22 includes the display panel according to any one of the above embodiments of the present application. In the embodiment of FIG. 22, only the mobile phone is given as an example to illustrate the display apparatus 1000, and it may be understood that, the display apparatus according to the embodiments of the present application may be other display apparatus with the display function, such as, a wearable product, a computer, a television, and a vehicle-mounted display apparatus, which are not are not particularly limited by the embodiments of the present application. The display apparatus according to the embodiments of the present application has the beneficial effects of the display panel according to the embodiments of the present application, reference is made to the specific description of the display panel in the above embodiments for details, which are not repeated herein.

The above embodiments of the present application do not exhaustively describe all the details and do not limit the present application to only the specific embodiments described. Obviously, many modifications and variations can be made based on the above description. These embodiments are selected and specifically described in the description to better explain the principles and practical applications of the present application, so that those skilled in the art can make good use of the present application and make modifications based on the present application. The present application is limited only by the claims, along with their full scope and equivalents.

What is claimed is:

1. A display panel comprising:

sub-pixels comprising a first sub-pixel and a second sub-pixel, the first sub-pixel comprising a first pixel circuit and a first light-emitting element which are connected to each other, the second sub-pixel comprising a second pixel circuit and a second light-emitting element which are connected to each other, and light-emitting colors of the first light-emitting element and the second light-emitting element being different;

the first pixel circuit comprising a first driving transistor and a first double-gate transistor which is connected to a gate of the first driving transistor;

the second pixel circuit comprising a second driving transistor and a second double-gate transistor which is connected to a gate of the second driving transistor;

the first double-gate transistor comprising a first transistor and a second transistor which are connected to a first node, and the first node being connected to one end of a first capacitor;

the second double-gate transistor comprising a third transistor and a fourth transistor which are connected to a second node, and the second node being connected to one end of a second capacitor; and along a direction perpendicular to a plane where the display panel is located, an overlapped area of two plates of the first capacitor being different from an overlapped area of two plates of the second capacitor.

2. The display panel according to claim 1, wherein the first light-emitting element emits blue light, the second light-emitting element emits red light or green light, and the overlapped area of the two plates of the first capacitor is greater than the overlapped area of the two plates of the second capacitor.

3. The display panel according to claim 1, wherein the first transistor is connected between the gate of the first driving transistor and the second transistor, and the third transistor is connected between the gate of the second driving transistor and the fourth transistor; and a channel area of the first transistor is less than a channel area of the third transistor.

4. The display panel according to claim 1, wherein the first transistor is connected between the gate of the first driving transistor and the second transistor, and the third transistor is connected between the gate of the second driving transistor and the fourth transistor; and a channel length of the second transistor is less than a channel length of the fourth transistor.

5. The display panel according to claim 1, wherein the first transistor is connected between the gate of the first driving transistor and the second transistor, and the third transistor is connected between the gate of the second driving transistor and the fourth transistor; and a channel area of the first transistor is less than a channel area of the second transistor.

6. The display panel according to claim 1, wherein the first transistor and the second transistor are connected by a first connection structure, the third transistor and the fourth transistor are connected by a second connection structure, and the display panel further comprises a first conductive portion and a second conductive portion which receive fixed voltage signals; and the first connection structure and the first conductive portion at least partially overlap along a thickness direction of the display panel to form the first capacitor, and the second connection structure and the second conductive portion at least partially overlap along the thickness direction of the display panel to form the second capacitor.

7. The display panel according to claim 6, wherein the first connection structure comprises a first sub-portion which overlaps with the first conductive portion along the thickness direction of the display panel;

the second connection structure comprises a second sub-portion which overlaps with the second conductive portion along the thickness direction of the display panel; and an area of the first sub-portion is greater than an area of the second sub-portion.

8. The display panel of claim 6, wherein the first conductive portion comprises a third sub-portion which overlaps with the first connection structure along the thickness direction of the display panel;

the second conductive portion comprises a fourth sub-portion which overlaps with the second connection structure along the thickness direction of the display panel; and an area of the third sub-portion is greater than an area of the fourth sub-portion.

9. The display panel according to claim 6, wherein a first electrode of the first driving transistor and a first electrode of the second driving transistor are connected to a first power supply line, the first double-gate transistor comprises a first threshold compensation transistor which is connected between the gate of the first driving transistor and a second electrode of the first driving transistor, and the second double-gate transistor comprises a second threshold compensation transistor which is connected between the gate of the second driving transistor and a second electrode of the second driving transistor.

10. The display panel according to claim 9, wherein the first capacitor comprises a first sub-capacitor, the second capacitor comprises a second sub-capacitor, the first connection structure comprises a first trace structure, the second connection structure comprises a second trace structure, the first transistor and the second transistor in the first threshold compensation transistor are connected by the first trace structure, and the third transistor and the fourth transistor in the second threshold compensation transistor are connected by the second trace structure;

the first conductive portion comprises a first shielding structure, the second conductive portion comprises a second shielding structure, the first shielding structure and the second shielding structure are connected to the first power supply lines, the first shielding structure and the first trace structure at least partially overlap along the thickness direction of the display panel to form the first sub-capacitor, and the second shielding structure and the second trace structure at least partially overlap along the thickness direction of the display panel to form the second sub-capacitor;

a first sub-portion of the first trace structure overlaps with the first shielding structure along the thickness direction of the display panel, and a second sub-portion of the second trace structure overlaps with the second shielding structure along the thickness direction of the display panel; and an area of the first sub-portion is greater than an area of the second sub-portion, and a shape and an area of an orthographic projection of the first shielding structure on the plane where the display panel is located are the same as a shape and an area of an orthographic projection of the second shielding structure on the plane where the display panel is located.

11. The display panel according to claim 6, wherein the first double-gate transistor comprises a first reset transistor which is connected between the gate of the first driving transistor and a reset signal line, and the second double-gate transistor comprises a second reset transistor which is connected between the gate of the second driving transistor and the reset signal line.

12. The display panel according to claim 11, wherein the first capacitor comprises a third sub-capacitor, the second capacitor comprises a fourth sub-capacitor, the first connection structure comprises a third trace structure, the second connection structure comprises a fourth trace structure, and the first transistor and the second transistor in the first reset transistor are connected by the third trace structure, and the third transistor and the fourth transistor in the second reset transistor are connected by the fourth trace structure;

the reset signal line of the display panel comprises a bulk portion, a third sub-portion, and a fourth sub-portion which are connected to each other, the first conductive portion comprises the third sub-portion, and the second conductive portion comprises the fourth sub-portion;

the third sub-portion and the third trace structure at least partially overlap along the thickness direction of the display panel to form the third sub-capacitor, and the fourth sub-portion and the fourth trace structure at least partially overlap along the thickness direction of the display panel to form the fourth sub-capacitor;

the bulk portion of the reset signal line extends along the first direction, and along a second direction, a line width of the third sub-portion is greater than a line width of the fourth sub-portion, and a shape and an area of an orthographic projection of the third trace structure on the plane where the display panel is located are the same as a shape and an area of an orthographic projection of the fourth trace structure on the plane where the display panel is located.

13. The display panel according to claim 1, wherein the first pixel circuit comprises a first storage capacitor which is connected between the gate of the first driving transistor and the first power supply line;

the second pixel circuit comprises a second storage capacitor which is connected between the gate of the second driving transistor and the first power supply line; and an overlapped area of two plates of the first storage capacitor is greater than an overlapped area of two plates of the second storage capacitor.

14. The display panel according to claim 1, wherein the first pixel circuit comprises a first coupling capacitor which is connected between the gate of the first driving transistor and a scanning signal line;

the second pixel circuit comprises a second coupling capacitor which is connected between the gate of the second driving transistor and the scanning signal line; and a capacitance value of the first coupling capacitor is greater than a capacitance value of the second coupling capacitor.

15. The display panel according to claim 14, wherein the display panel comprises a first connection portion and a second connection portion, the first connection portion is connected to the gate of the first driving transistor and the first double-gate transistor, and the second connection portion is connected to the gate of the second driving transistor and the second double-gate transistor; and the first connection portion and the scanning signal line at least partially overlap along the thickness direction of the display panel to form the first coupling capacitor, and the second connection portion and the scanning signal line at least partially overlap along the thickness direction of the display panel to form the second coupling capacitor.

16. The display panel according to claim 1, wherein the first double-gate transistor is configured to write a first reset voltage to the gate of the first driving transistor, and the second double-gate transistor is configured to write a second reset voltage to the gate of the second driving transistor; and the first reset voltage is less than the second reset voltage.

17. The display panel according to claim 1, wherein the sub-pixels further comprise a third sub-pixel comprising a third pixel circuit and a third light-emitting element which are connected to each other, and light-emitting colors of the first light-emitting element, the second light-emitting element, and the third light-emitting element are different one another;

the third pixel circuit comprises a third driving transistor and a third double-gate transistor which is connected to a gate of the third driving transistor, the third double-gate transistor comprises a fifth transistor and a sixth transistor which are connected to a third node, and the third node is connected to one end of a third capacitor; and an overlapped area of two plates of the third capacitor is the same as an overlapped area of two plates of one of the first capacitor and the second capacitor.

18. The display panel according to claim 1, wherein the sub-pixels further comprise a third sub-pixel comprising a third pixel circuit and a third light-emitting element which are connected to each other, and light-emitting colors of the first light-emitting element, the second light-emitting element, and the third light-emitting element are different one another;

the third pixel circuit comprises a third driving transistor and a third double-gate transistor which is connected to a gate of the third driving transistor, the third double-gate transistor comprises a fifth transistor and a sixth transistor which are connected to a third node, and the third node is connected to one end of a third capacitor; and an overlapped area of two plates of the third capacitor is different from an overlapped area of two plates of each of the first capacitor and the second capacitor.

19. The display panel according to claim 1, wherein the first light-emitting element emits blue light, and the second light-emitting element emits red light or green light.

20. A display apparatus comprising a display panel, the display panel comprising:

sub-pixels comprising a first sub-pixel and a second sub-pixel, the first sub-pixel comprising a first pixel circuit and a first light-emitting element which are connected to each other, the second sub-pixel comprising a second pixel circuit and a second light-emitting element which are connected to each other, and light-emitting colors of the first light-emitting element and the second light-emitting element being different;

the first pixel circuit comprising a first driving transistor and a first double-gate transistor which is connected to a gate of the first driving transistor;

the second pixel circuit comprising a second driving transistor and a second double-gate transistor which is connected to a gate of the second driving transistor;

the first double-gate transistor comprising a first transistor and a second transistor which are connected to a first node, and the first node being connected to one end of a first capacitor;

the second double-gate transistor comprising a third transistor and a fourth transistor which are connected to a second node, and the second node being connected to one end of a second capacitor; and along a direction perpendicular to a plane where the display panel is located, an overlapped area of two plates of the first capacitor being different from an overlapped area of two plates of the second capacitor.

* * * * *